(12) United States Patent
Gowda et al.

(10) Patent No.: US 11,302,331 B2
(45) Date of Patent: Apr. 12, 2022

(54) METHOD AND DEVICE FOR SPEECH RECOGNITION

(71) Applicant: Samsung Electronics Co., Ltd., Suwon-si (KR)

(72) Inventors: Dhananjaya N. Gowda, Suwon-si (KR); Kwangyoun Kim, Suwon-si (KR); Abhinav Garg, Suwon-si (KR); Chanwoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,274

(22) Filed: Jan. 23, 2020

(65) Prior Publication Data

US 2020/0234713 A1    Jul. 23, 2020

Related U.S. Application Data

(60) Provisional application No. 62/848,698, filed on May 16, 2019, provisional application No. 62/795,736, filed on Jan. 23, 2019.

(30) Foreign Application Priority Data

Dec. 3, 2019    (KR) .......................... 10-2019-0159359

(51) Int. Cl.
*G10L 15/26*    (2006.01)
*G10L 15/02*    (2006.01)
(Continued)

(52) U.S. Cl.
CPC .............. *G10L 15/26* (2013.01); *G10L 15/02* (2013.01); *G10L 15/28* (2013.01); *G10L 17/04* (2013.01); *G10L 17/20* (2013.01)

(58) Field of Classification Search
CPC ......... G10L 15/02; G10L 15/26; G10L 15/28; G10L 17/04; G10L 17/20; G10L 15/16;
(Continued)

(56) References Cited

U.S. PATENT DOCUMENTS 8,103,020 B2    1/2012   Avendano et al.
8,825,481 B2    9/2014   Thambiratnam et al.
(Continued)

FOREIGN PATENT DOCUMENTS

EP    3 624 114 A1    3/2020
JP    7-113917         5/1995
(Continued)

OTHER PUBLICATIONS

Zeyer et al ("Improved training of end-to-end attention models for speech recognition," Proc. Interspeech 2018, pp. 7-11). (Year: 2018).*

(Continued)

*Primary Examiner* — Angela A Armstrong
(74) *Attorney, Agent, or Firm* — Nixon & Vanderhye P.C.

(57) ABSTRACT

Provided are an electronic device for recognizing speech of a user, and a method, performed by the electronic device, of recognizing speech. The method includes obtaining an audio signal based on a speech input based on the audio signal being input, obtaining an output value of a first automatic speech recognition (ASR) model that outputs a character string at a first level; obtaining an output value of a second ASR model that outputs a character string at a second level corresponding to the audio signal based on the output value of the first ASR model based on the audio signal being input; and recognizing the speech from the output value of the second ASR model.

14 Claims, 16 Drawing Sheets

(51) Int. Cl.
    *G10L 17/20* (2013.01)
    *G10L 17/04* (2013.01)
    *G10L 15/28* (2013.01)

(58) Field of Classification Search
    CPC .... G10L 15/32; G06N 3/0445; G06N 3/0454; G06N 3/08
    See application file for complete search history.

(56) References Cited

U.S. PATENT DOCUMENTS

| | | | |
|---|---|---|---|
| 9,031,268 | B2 | 5/2015 | Fejzo et al. |
| 9,305,554 | B2 | 4/2016 | Jagatheesan et al. |
| 9,508,340 | B2 | 11/2016 | Parada San Martin et al. |
| 9,703,350 | B2 | 7/2017 | Nigam et al. |
| 9,754,584 | B2 | 9/2017 | Parada San Martin et al. |
| 9,852,729 | B2 | 12/2017 | Hoffmeister |
| 9,954,506 | B2 | 4/2018 | Seefeldt |
| 10,032,449 | B2 | 7/2018 | Chen et al. |
| 10,783,178 | B2 | 9/2020 | Garrett et al. |
| 2005/0126369 | A1 | 6/2005 | Kirkeby et al. |
| 2005/0182628 | A1 | 8/2005 | Choi |
| 2011/0035219 | A1 | 2/2011 | Kadirkamanathan et al. |
| 2011/0313764 | A1 | 12/2011 | Bacchiani et al. |
| 2013/0191126 | A1 | 7/2013 | Thambiratnam et al. |
| 2014/0379334 | A1 | 12/2014 | Fry |
| 2015/0025890 | A1 | 1/2015 | Jagatheesan et al. |
| 2016/0019887 | A1 | 1/2016 | Kim et al. |
| 2017/0018270 | A1 | 1/2017 | Min |
| 2017/0092265 | A1 | 3/2017 | Sainath et al. |
| 2018/0061402 | A1 | 3/2018 | Devaraj et al. |
| 2018/0197533 | A1 | 7/2018 | Lyon et al. |
| 2018/0211652 | A1 | 7/2018 | Mun et al. |
| 2019/0043481 | A1 | 2/2019 | Georges et al. |
| 2019/0122654 | A1 | 4/2019 | Song et al. |
| 2019/0172467 | A1 | 6/2019 | Kim et al. |
| 2020/0043483 | A1* | 2/2020 | Prabhavalkar .......... G10L 15/16 |
| 2020/0335091 | A1* | 10/2020 | Chang ..................... G10L 15/28 |

FOREIGN PATENT DOCUMENTS

| | | |
|---|---|---|
| KR | 10-2008-0077874 | 8/2008 |
| KR | 10-1295727 | 8/2013 |
| KR | 10-2016-0010961 | 1/2016 |
| KR | 10-2018-0090046 | 8/2018 |
| KR | 10-2019-0014569 | 2/2019 |
| KR | 10-2019-0045038 | 5/2019 |
| KR | 10-2167157 B1 | 10/2020 |
| WO | 2017-217978 | 12/2017 |
| WO | WO 2017/217978 A1 | 12/2017 |
| WO | 2018/028767 | 2/2018 |
| WO | WO 2021/040842 A1 | 3/2021 |

OTHER PUBLICATIONS

International Search Report and Written Opinion dated Mar. 4, 2020 in counterpart International Application No. PCT/KR2019/016181.
International Search Report and Written Opinion dated May 6, 2020 in counterpart International Application No. PCT/KR2020/001061.
Kim, Chanwoo et al., "Improved vocal tract length perturbation for a state-of-the art end-to-end speech recognition system," Interspeech 2019, Sep. 19, 2019, pp. 739-741.
Dario Amodei, et al., "Deep Speech 2: End-to-End Speech Recognition in English and Mandarin", in Proceedings of The 33rd International Conference on Machine Learning, accessed Dec. 8, 2015, 28 pages.
Hossein Hadian, et al., "End-to-end speech recognition using lattice-free MMI", Interspeech, Hyderabad, Sep. 2-6, 2018, pp. 12-16.
Geoffrey Hinton, et al., "Deep Neural Networks for Acoustic Modeling in Speech Recognition: The shared views of four research groups", Apr. 27, 2012, 27 pages.
Kazuki Irie, et al., "On the Choice of Modeling Unit for Sequence-to-Sequence Speech Recognition", accessed Jul. 23, 2019, 5 pages.
Chanwoo Kim, et al., "Generation of large-scale simulated utterances in virtual rooms to train deep-neural networks for far-field speech recognition in Google Home", Interspeech-2017, Aug. 2017, 5 pages.
Bo Li, et al., "Acoustic Modeling for Google Home", Interspeech 2017, Aug. 20-24, 2017, pp. 399-403.
Paul Mermelstein, "Automatic segmentation of speech into syllabic units," The Journal of the Acoustical Society of America, vol. 58, Jan. 1975, 10 pages.
Kanishka Rao, et al., "Exploring Architectures, Data and Units for Streaming End-To-End Speech Recognitionwith RNN-Transducer", Google Inc., accessed Jan. 2, 2018, 7 pages.
Tara N. Sainath, et al., "Raw Multichannel Processing using Deep Neural Networks", New Era for Robust Speech Recognition, Oct. 2017, 28 pages.
Tara N. Sainath, et al., "Multichannel Signal Processing with Deep Neural Networks for Automatic Speech Recognition", IEEE/ACM Trans. Audio, Speech, Lang. Process., Feb. 2017, 15 pages.
Ramon Sanabria, et al., "Hierarchical Multitask Learning With CTC", IEEE Workshop on Spoken Language Technology, accessed Jan. 14, 2019, 6 pages.
Johan Schalkwyk, et al., "An All-Neural On-Device Speech Recognizer", Google AI Blog: An All-Neural On-Device Speech Recognizer, dated Mar. 12, 2019, printed Jan. 22, 2020, 4 pages, https://ai.googleblog.com/2019/03/an-all-neural-on-device-speech.html.
Michael L. Seltzer, et al., "An Investigation of Deep Neural Networks for Noise Robust Speech Recognition", Int. Conf. Acoust. Speech, and Signal Processing, 2013, 5 pages.
Shane Settle, et al., "End-to-End Multi-Speaker Speech Recognition", Mitsubishi Electric Research Laboratories (MERL), Apr. 2018, 7 pages.
Vincent Vanhoucke, et al., "Improving the speed of neural networks on CPUs", Deep Learning and Unsupervised Feature Learning NIPS Workshop, 2011, 8 pages.
Zichao Yang, et al., "Hierarchical Attention Networks for Document Classification", NAACL HLT 2016, 10 pages.
Chengzhu Yu, et al., "A Multistage Training Framework for Acoustic-to-Word Model", Interspeech, Hyderabad, Sep. 2-6, 2018, pp. 786-790.
Dong Yu, et al., "Feature Learning in Deep Neural Networks—Studies on Speech Recognition Tasks", accessed Mar. 8, 2013, 9 pages.
A. Zehetner, et al., "Wake-Up-Word Spotting for Mobile Systems", EUSIPCO 2014, 5 pages.
International Search Report and Written Opinion dated Aug. 13, 2020 in corresponding International Application No. PCT/KR2020/006300.
European Search Report dated Dec. 7, 2021 for EP Application No. 20806657.1.
Rygaard et al., "Using Synthesized Speech to Improve Speech Recognition for Low-Resource Languages", Dec. 31, 2015; pp. 1-6; XP055512265.
Ueno et al., "Multi-speaker Sequence-to-sequence Speech Synthesis for Data Augmentation in Acoustic-to-word Speech Recognition" May 12, 2019 ICASSP2019-2019 IEEE International Conference On Acoustics,Speech and Signal Processing; pp. 1-5.
Sharma et al., "Adaption of RNN Transducer with Text-To-Speech Technology for Keyword Spotting" May 4, 2020; 1CASSP2020-2020IEFF International Conference Onacoustics, Speech and Signal Processing; pp. 1-5.
Extended European Search Report dated Oct. 14, 2021 for EP Application No. 20744656.8.
Williams et al., "Contextual Speech Recognition in End-to-End Neural Network Systems Using Beam Search" Interspeech 2018; XP55719650A, pp. 1-5.
Gowda et al., "Multi-Task, Multi-Resolution char-to-BPE cross-attention decoder for end-to-end speech recognition", Interspeech 2019; pp. 1-5; Sep. 15, 2019; XP055846610.
Garg et al., "Improved Multi-Stage Training of Online Attention-Based Encoder-Decoder Models", 2019 IEEE Automatic Speech Recognition and Understanding Workshop, Dec. 14, 2019; pp. 1-8; XP033718917.

(56) References Cited

OTHER PUBLICATIONS

Extended European Search Report dated Oct. 28, 2021 for EP Application No. 19888960.2.
Gouda et al., "Robust Automatic Speech Recognition System Based on Using Adaptive Time-Frequency Masking" Dec. 20, 2016 XP33046674A; 1-6 pgs., 11$^{th}$ International Conference on Computer Engineering.
Sinha et al., "A shift-based approach to speaker normalization using non-linear frequency-scaling model" Jan. 29, 2008 XP22436795A, vol. 50, No. 3, Speech Communication.
Umesh et al., "A study of Filter Bank Smoothing in MFCC Features for Recognition of Children's Speech" Oct. 15, 2007 XP11192988A; 13pgs., vol. 15, No. 8 IEEE Transactions on Audio, Speech and Language Processing.
Lin et al., "Improved Histogram Equalzaiton(HEQ) for Robust Speech Recognition" Jul. 2, 2007 XP31124105A, 4pgs., Multi Media and Expo, 2007 IEEE International Conference.

\* cited by examiner

METHOD AND DEVICE FOR SPEECH RECOGNITION

CROSS-REFERENCE TO RELATED APPLICATIONS

This application is based on and claims priority under 35 U.S.C. § 119 to U.S. Provisional Patent Application No. 62/795,736, filed on Jan. 23, 2019, and U.S. Provisional Patent Application No. 62/848,698, filed on May 16, 2019, in the United States Patent and Trademark Office, and Korean Patent Application No. 10-2019-0159359, filed on Dec. 3, 2019, in the Korean Intellectual Property Office, the disclosures of which are incorporated by reference herein in their entireties.

BACKGROUND

1. Field

The disclosure relates to a device and a method for speech recognition. For example, the disclosure relates to a speech recognition device and a speech recognition method for hierarchically processing audio signals for speech recognition.

2. Description of Related Art

Speech recognition, such as Automatic Speech Recognition (ASR), may refer to a technology in which speech of a human being is received, recognized, and translated into text. ASR is being utilized in various electronic devices such as smartphones, air-conditioners, refrigerators, and artificial intelligence (AI) speakers. First, an apparatus receives speech of a human being, recognizes the received speech using an ASR model trained in advance within the apparatus, and translates the recognized speech into text. The text is a final output. Recently, deep neural network (DNN) algorithms have been used in various machine learning fields and their performance has been improved. Due to the use of neural networks, great performance improvement has also been achieved in the ASR field, and an end-to-end ASR model for speech recognition has recently been researched.

Various technologies for recognizing speech of a user have been recently studied in the ASR field, and an artificial neural network-based ASR method using an end-to-end learning scheme has been actively researched. In particular, in the ASR field, there is demand for the development of technology for improving the accuracy of ASR.

SUMMARY

Embodiments of the disclosure provide an automatic speech recognition (ASR) device and an ASR method by which speech of a user is recognized using an ASR model having a hierarchical structure that outputs ASR results of different levels.

Embodiments of the disclosure an ASR device and an ASR method by which speech of a user is recognized using an ASR model trained in stages to output ASR results of different levels.

Additional aspects will be set forth in part in the description which follows and, in part, will be apparent from the description.

According to an example embodiment of the disclosure, a method includes obtaining an audio signal based on a speech input; obtaining an output value of a first speech recognition model that outputs a character string at a first level based on the audio signal being input; obtaining an output value of a second speech recognition model that outputs a character string at a second level corresponding to the audio signal based on the output value of the first speech recognition model based on the audio signal being input; and recognizing the speech from the output value of the second speech recognition model.

According to another example embodiment of the disclosure, an electronic device for recognizing speech includes: a memory storing a program including one or more instructions; and a processor configured to execute the one or more instructions to control the electronic device to: obtain an audio signal based on a speech input; obtain an output value of a first speech recognition model that outputs a character string at a first level based on the audio signal being input; obtain an output value of a second speech recognition model that outputs a character string at a second level corresponding to the audio signal based on the output value of the first speech recognition model based on the audio signal being input; and recognize the speech from the output value of the second speech recognition model.

According to another example embodiment of the disclosure, a non-transitory computer-readable recording medium has recorded thereon a computer program, which, when executed by a computer, performs a method including: obtaining an audio signal based on a speech input; obtaining an output value of a first speech recognition model that outputs a character string at a first level based on the audio signal being input; obtaining an output value of a second speech recognition model that outputs a character string at a second level corresponding to the audio signal based on the output value of the first speech recognition model based on the audio signal being input; and recognizing the speech from the output value of the second speech recognition model.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
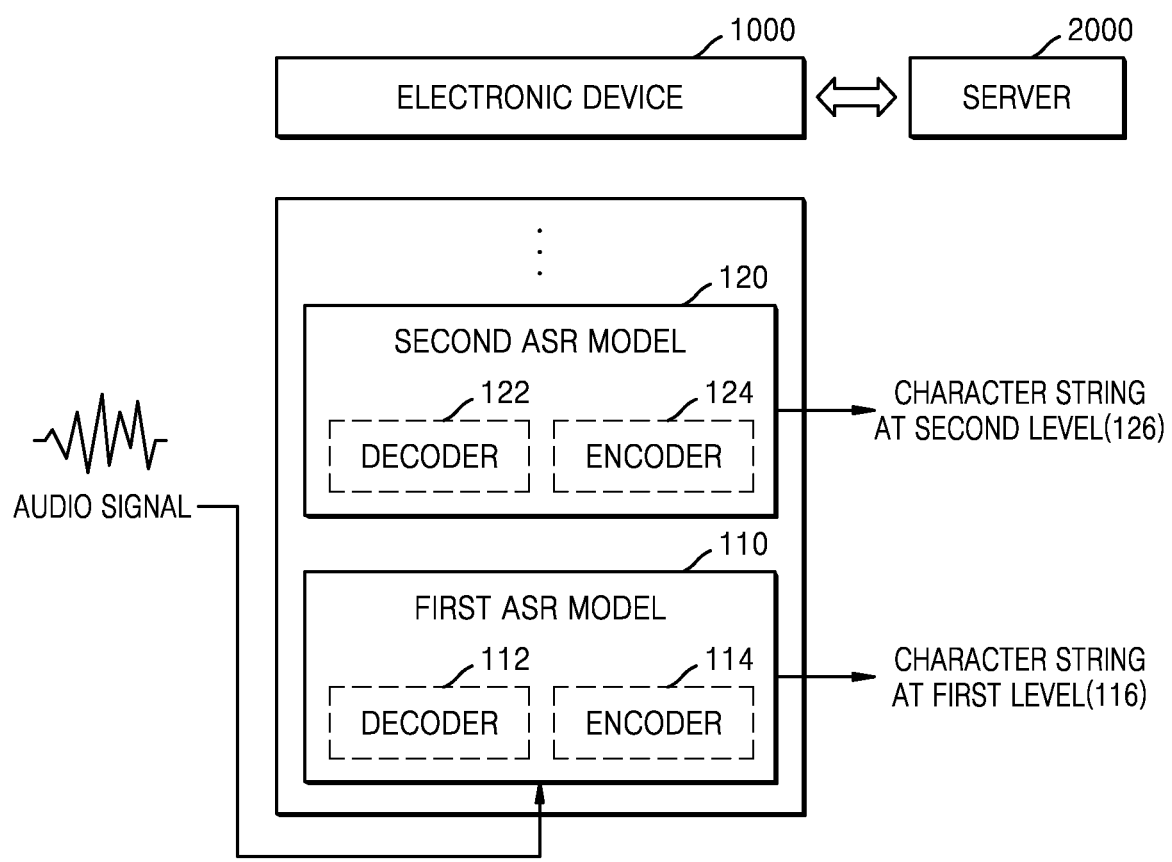
FIG. 1 is a block diagram illustrating an example method, performed by an electronic device, of recognizing speech of a user, according to an embodiment of the disclosure.

Hereinafter, the terms used in the disclosure will be briefly described, and then the disclosure will be described in greater detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected may also be used in a specific case. In this case, their meanings are provided in the detailed description. The terms are defined based on their meanings and the contents of the entire disclosure, not by simply stating the terms.

Throughout the disclosure, the expression "at least one of a, b or c" indicates only a, only b, only c, both a and b, both a and c, both b and c, all of a, b, and c, or variations thereof.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Examples are described in detail herein with reference to the accompanying drawings. The disclosure may, however, be embodied in many different forms and should not be understood as being limited to the examples set forth herein. In the drawings, parts irrelevant to the description may be omitted for simplicity of explanation, and like numbers refer to like elements throughout.

FIG. 1 is a block diagram illustrating an example method, performed by an electronic device 1000, of recognizing speech of a user, according to an embodiment of the disclosure.

According to an embodiment of the disclosure, the electronic device 1000 may include an end-to-end speech recognition model, such as an automatic speech recognition (ASR) model. For example, the electronic device 1000 may obtain an audio signal and may input the obtained audio signal to an ASR model to thereby recognize speech of a user within the audio signal.

The end-to-end ASR model may, for example, be an ASR model that recognizes a character string from speech via an integrated neural network, and may be an ASR model having a structure including an integrated neural network without separately using an acoustic model, a pronunciation dictionary, and a language model. Because the end-to-end ASR model uses an integrated neural network, the end-to-end ASR model may translate the speech into text without a process of recognizing a phoneme from speech and then translating the speech into text. The end-to-end ASR model may have a structure including a recurrent network, and may include an encoder for encoding a speech input and a decoder for estimating a character string from an output value of the encoder.

The encoder included in the electronic device 1000 may determine acoustic information about a phonetic feature represented by a user's speech, by encoding an audio signal including a speech input of the user. The decoder in the electronic device 1000 may use, based on the output value of the encoder, linguistic information such that the end-to-end ASR model outputs a character string according to a certain level.

Examples of the electronic device 1000 may include, but are not limited to, a smartphone, a tablet personal computer (PC), a PC, a smart television (TV), a mobile phone, a personal digital assistant (PDA), a laptop, a media player, a server, a micro-server, a global positioning system (GPS) device, an electronic book terminal, a digital broadcasting terminal, a navigation device, a kiosk, an MP3 player, a digital camera, a speaker, and other mobile or non-mobile computing devices, each of which includes an AI program mounted thereon and has an ASR function.

According to an embodiment of the disclosure, the electronic device 1000 may recognize speech of a user within an audio signal by interoperating with a server 2000 connected to the electronic device 1000 via a network. According to an embodiment of the disclosure, the network may include, for example, and without limitation, a local area network (LAN), a wide area network (WAN, a value added network (VAN), a mobile radio communication network, a satellite communication network, and a combination thereof. The server 2000 connected to the electronic device 1000 via the network may include at least one other electronic device capable of communicating with the electronic device 1000.

According to an embodiment of the disclosure, the electronic device 1000 may include a plurality of ASR models. For example, the electronic device 1000 may include a first ASR model 110 and a second ASR model 120. However, embodiments of the disclosure are not limited thereto, and the electronic device 1000 may include a single ASR model or more ASR models than the two ASR models. The electronic device 1000 may recognize the speech of the user within the audio signal using ASR models that output ASR results of different levels.

The electronic device 1000 may provide a character string 116 at a first level from the audio signal using the first ASR model 110. The electronic device 1000 may provide a character string 126 at a second level from the audio signal using the second ASR model 120. According to an embodiment of the disclosure, the electronic device 1000 may together output the character string 116 at the first level as an ASR result of the first ASR model 110 and the character string 126 at the second level as an ASR result of the second ASR model 120. However, the electronic device 1000 may provide only the character string 126 at the second level as an ASR result from the audio signal to the user.

The first ASR model 110 may include an encoder 114. However, the first ASR model 110 may include the encoder 114 and a decoder 112. When the first ASR model 110 includes the encoder 114, the electronic device 1000 may obtain a character string at a first level from an output value of the encoder 114, by separately applying, to the output value of the encoder 114, a projection layer for converting the dimension of the output value of the encoder 114 into the dimension of an output value of a soft max layer and the soft max layer for outputting a probability value for an output value of the projection layer. According to another embodiment of the disclosure, when the first ASR model 110 includes the encoder 114 and the decoder 112, the electronic device 1000 may obtain a character string at a first level from an output value of the decoder 112, by applying a projection layer for converting the dimension of the output value of the decoder 112 into the dimension of the output value of a soft max layer and the soft max layer to the output value of the decoder 112. However, the aforementioned projection layer and the aforementioned soft max layer may be included in the decoder 112, and the electronic device 1000 may obtain the character string at the first level from the output value of the encoder 114 using the decoder 112.

Although the first ASR model 110 is illustrated as being divided into the encoder 114 and the decoder 112 in FIG. 1, an internal structure of the first ASR model 110 is not limited to an encoder and a decoder. For example, the first ASR model 110 may include a plurality of stacked long short-term memory (LSTM) layers, and a projection layer that projects a hidden layer vector output by the plurality of stacked LSTM layers using a D×N matrix and a soft max layer that outputs a probability value of a label corresponding to the output value of the projection layer, in order to convert a dimension D of the hidden layer vector into a probability value for each label of N outputs within the soft max layer.

However, when the first ASR model 110 includes the plurality of stacked LSTM layers, the projection layer, and the soft max layer, the plurality of stacked LSTM layers may determine acoustic information about the phonetic feature represented by speech of a user by encoding an audio signal including a speech input of the user, similar to a function of an encoder, and the projection layer and the soft max layer within the first ASR model 110 may output the character string at the first level using linguistic information such that an ASR model outputs a character string of a certain level, based on the output value of the encoder.

The second ASR model 120 may include an encoder 124. However, the second ASR model 120 may include the encoder 124 and a decoder 122. When the second ASR model 120 includes the encoder 124, the electronic device 1000 may obtain a character string at a second level from an output value of the encoder 124, by separately applying, to the output value of the encoder 124, a projection layer for converting the dimension of the output value of the encoder 124 into the dimension of an output value of a soft max layer and the soft max layer for determining a probability value for the output value of the projection layer. According to another embodiment of the disclosure, when the second ASR model 120 includes the encoder 124 and the decoder 122, the electronic device 1000 may obtain a character string at a second level from an output value of the decoder 122, by applying a projection layer for converting the dimension of the output value of the decoder 122 into the dimension of an output value within a soft max layer and the soft max layer to the output value of the decoder 122.

According to another embodiment of the disclosure, the second ASR model 120 may include only the decoder 122, and the electronic device 1000 may obtain the character string at the second level, by applying the projection layer and the soft max layer to the output value of the decoder 122, based on an output value of the first ASR model 110.

However, like the above-described first ASR model 110, the projection layer and the soft max layer may be included in the decoder 122, and the electronic device 1000 may obtain the character string at the second level directly from the output value of the decoder 122 including the projection layer and the soft max layer.

Although the second ASR model 120 is illustrated as being divided into the encoder 124 and the decoder 112 in FIG. 1, an internal structure of the second ASR model 120 is not limited to the encoder 124 and the decoder 122. For example, the second ASR model 120 may include a plurality of stacked long short-term memory (LSTM) layers, and a projection layer that projects a hidden layer vector output by the plurality of stacked LSTM layers using a D×N matrix and a soft max layer that outputs a probability value of a label corresponding to the output value of the projection layer, in order to convert a dimension D of the hidden layer vector into a probability value for each label of N outputs within the soft max layer.

When the second ASR model 120 includes the plurality of stacked LSTM layers, the projection layer, and the soft max layer, the plurality of stacked LSTM layers may determine acoustic information about the phonetic feature represented by speech of a user by encoding an audio signal including a speech input of the user, similar to a function of an encoder, and the projection layer and the soft max layer may output the character string at the second level using linguistic information such that an ASR model outputs a character string at a certain level, based on the output value of the encoder.

According to an embodiment of the disclosure, the second ASR model 120 used by the electronic device 1000 may output the character string at the second level from the audio signal, based on an output value of the first ASR model 110. However, embodiments of the disclosure are not limited thereto, and the second ASR model 120 may independently output the character string at the second level as an ASR result of the second level, not based on an ASR result of the first ASR model 110. A character string obtained from an audio signal using an ASR model by the electronic device 1000 may include at least one character. According to an embodiment of the disclosure, the character string may include a plurality of sub-strings including at least one character.

According to an embodiment of the disclosure, when the character string at the first level includes grapheme-unit sub-strings (for example, h, e, l, l, o, i, a, m, a, t, e, a, c, h, e, and r), the character string at the second level may include sub-strings of a byte pair encoding (BPE) unit (for example, hell, o, i, am, a, tea, ch, and er) or word-unit sub-strings (for example, hello, i, am, a, and teacher). In other words, the character string at the second level output by the second ASR model 120 may include the sub-sets of a set including, as an element, at least one character within the character string at the first level. BPE may be a character compression algorithm for generating a sub-word or word-piece by replacing a byte pair repeated within a character string with a byte that is no longer repeated, when one character within the character string is one byte. In other words, a BPE unit according to an embodiment of the disclosure may correspond to a sub-word or word-piece.

However, according to another embodiment of the disclosure, when the character string at the first level includes phoneme-unit sub-strings, the character string at the second level may include character-unit sub-strings or word-unit sub-strings. In other words, sub-strings within a character string at a second level output by a second ASR model may include other text units closer to a semantically-completed word than sub-strings within a character string at a first level output by a first ASR model. In other words, as an ASR model of the electronic device 1000 outputs a character string at a high level, sub-strings within the character string may be closer to semantically-completed words. According to an embodiment of the disclosure, as will be described in greater detail below, a plurality of ASR models included in the electronic device 1000 and an encoder or decoder within the ASR models may be trained in stages to output different levels of ASR results.

Figure 2:
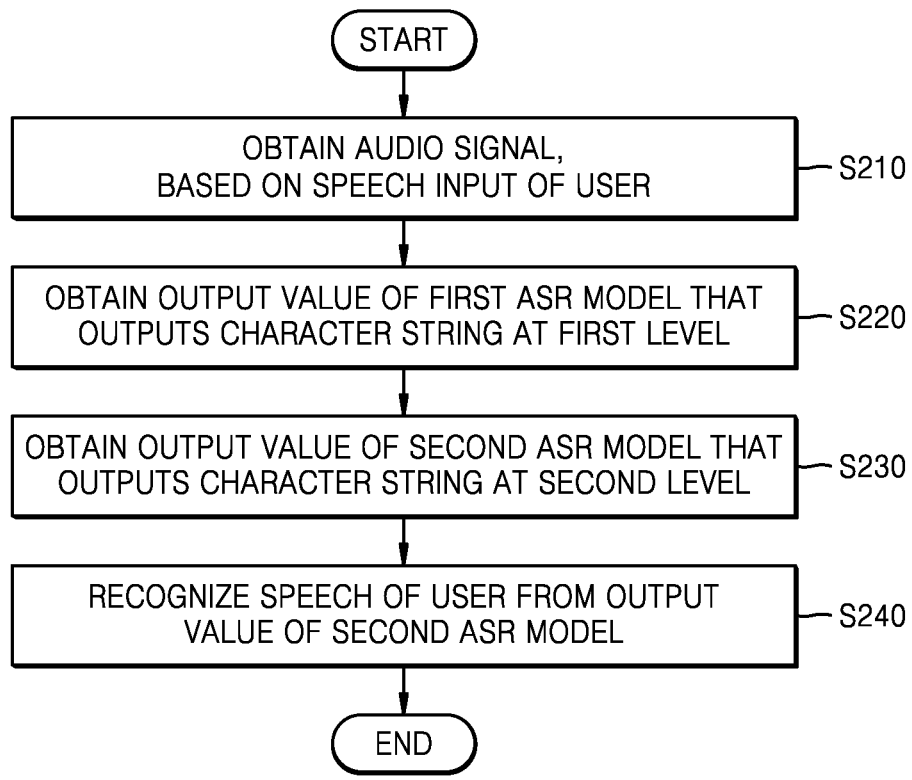
FIG. 2 is a flowchart illustrating an example method, performed by an electronic device, of recognizing speech of a user, according to an embodiment of the disclosure.

FIG. 2 is a flowchart illustrating an example method, performed by the electronic device 1000, of recognizing speech of a user, according to an embodiment of the disclosure.

In operation S210, the electronic device 1000 may obtain an audio signal, based on a speech input of a user. For example, the electronic device 1000 may obtain an audio signal divided into a plurality of frames, obtain a feature value of the audio signal in units of frames, and input the obtained feature values of the frames of the audio signal to an ASR model.

In operation S220, the electronic device 1000 may obtain an output value of a first ASR model that outputs a character string at a first level, by inputting the audio signal to the first ASR model. The output value of the first ASR model may include at least one of information about an ASR result of a first level (for example, a character string including grapheme-unit sub-strings) and an output value of a first encoder within the first ASR model.

In operation S230, the electronic device 1000 may obtain an output value of a second ASR model that outputs a character string at a second level. According to an embodiment of the disclosure, the electronic device 1000 may train the second ASR model to output the character string at the second level corresponding to the audio signal, based on the output value of the first ASR model, and may obtain the character string at the second level from the output value of the second ASR model.

According to an embodiment of the disclosure, the electronic device 1000 may train the second ASR model, based on the output value of the first encoder within the first ASR model and an ASR result value of the first ASR model from among the output values of the first ASR model, and may provide the character string at the second level using the trained second ASR model.

In other words, the electronic device 1000 may train the second ASR model such that the character string at the second level is output using both linguistic information represented by information about an ASR result of a first level and user acoustic information represented by the output value of the first encoder within the first ASR model from among the output values of the first ASR model, and may provide the character string at the second level using the trained second ASR model, thereby more accurately recognizing speech of a user in stages. However, according to another embodiment of the disclosure, the electronic device 1000 may train the second ASR model such that the second ASR model outputs the character string at the second level using only the output value of the first encoder within the first ASR model.

In operation S240, the electronic device 1000 may recognize the speech of the user from the output value of the second ASR model. For example, the electronic device 1000 may apply a projection layer for conversion into the format of a soft max layer to an output terminal of the second ASR model. An operation, performed by the electronic device 1000, of converting the output value of an ASR model into the format of a soft max layer may correspond to an operation of projecting a hidden layer vector within the output value of the ASR model using a D×N matrix in order to convert a dimension D of the hidden layer vector into a probability value for each label of N outputs within the soft max layer. In other words, according to an embodiment of the disclosure, the electronic device 1000 may obtain a character string from the output value of the second ASR model by applying the projection layer to the output value of the second ASR model of the D dimension and inputting the output value of the second ASR model of an N dimension to which the projection layer has been applied to a soft max layer that outputs a probability value for a label including information about the character string at the second level.

An operation, performed by the electronic device 1000, of inputting an output value of the second ASR model of which a dimension has been converted via the projection layer may further include an operation of enabling a sum of all probability values to be 1 by normalizing a probability value corresponding to each label within the soft max layer using a soft max function. According to an embodiment of the disclosure, when the soft max layer includes the projection layer, the electronic device 1000 may obtain a character string from the output value of the second ASR model by directly inputting the output value of the second ASR model to the soft max layer.

Figure 3:
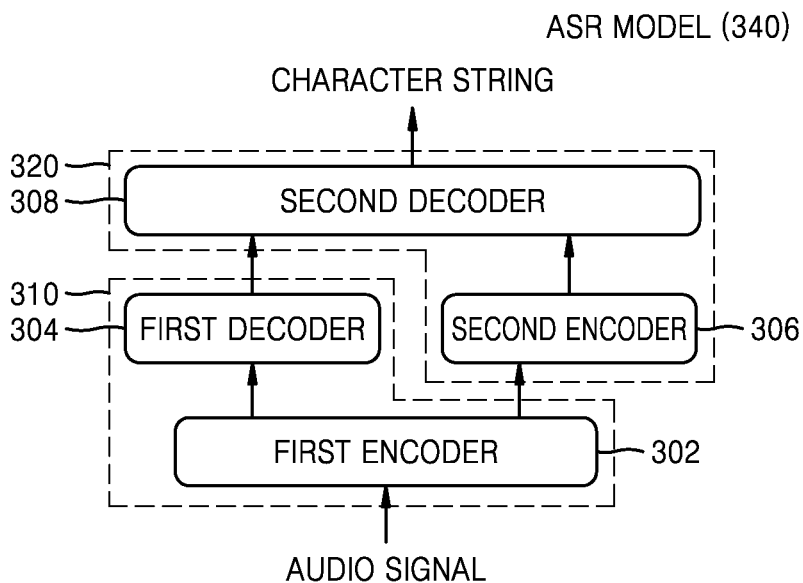
FIG. 3 is a block diagram illustrating an example automatic speech recognition (ASR) model used by an electronic device to recognize speech of a user, according to an embodiment of the disclosure.

FIG. 3 is a block diagram illustrating an example ASR model used by an electronic device to recognize speech of a user according to an embodiment of the disclosure.

According to an embodiment of the disclosure, an ASR model 340 used by the electronic device 1000 to recognize speech of a user may include a first ASR model 310 and a second ASR model 320. According to an embodiment of the disclosure, the first ASR model 310 may be trained to output a character string at a first level, and the second ASR model 320 may be trained to output a character string at a second level.

According to an embodiment of the disclosure, the first ASR model 310 may include a first encoder 302 that encodes an audio signal such that the first ASR model 310 outputs a character string at a first level. However, the first ASR model 310 may further include a first decoder 304 that determines the character string at the first level corresponding to the audio signal from an output value of the first encoder 302, in addition to the first encoder 302.

The first encoder 302 included in the first ASR model 310 may include a plurality of stacked LSTM layers, and the first decoder 304 included therein may include the above-described projection layer and the above-described soft max layer. However, the structure of a first ASR model is not limited to division into an encoder and a decoder, and the first ASR model may include LSTM layers that determine acoustic information about a phonetic feature represented by speech of a user by encoding an audio signal, similar to a function of an encoder, and a projection layer and a soft max layer that project a hidden layer vector output by at least one of the LSTM layers and output a character string corresponding to an output value of the projection layer, similar to a function of a decoder.

The first encoder 302 and the first decoder 304 within the first ASR model 310 may be trained such that the first ASR model outputs the character string at the first level. For example, the electronic device 1000 may obtain an audio signal including speech of a user and may input the obtained audio signal to the first encoder 302 of the first ASR model 310. When a first ASR model includes the first encoder 302, the electronic device 1000 may determine the output value of the first encoder 302 to be the output value of the first ASR model 310. According to another embodiment of the disclosure, when a first ASR model includes the first encoder 302 and the first decoder 304, the electronic device 1000 may decode the output value of the first encoder 302 via the first decoder 304, and may determine a first ASR result (for example, the character string at the first level) obtained from the output value of the first decoder 304 and the output value of the first encoder 302 to be the output values of the first ASR model.

In other words, the output values of the first ASR model according to an embodiment of the disclosure may include only the output value of the first encoder 302, or may include both the output value of the first encoder 302 and information about the first ASR result obtained from the output value of the first decoder 304. According to an embodiment of the disclosure, the electronic device 1000 may determine the output value of the first ASR model by concatenating the output value of the first encoder 302 and the information about the first ASR result.

According to another embodiment of the disclosure, when a first ASR model includes a plurality of stacked LSTM layers, a projection layer, and a soft max layer, the output values of the first ASR model may include a hidden layer vector output by one of the plurality of LSTM layers in the first ASR model and information about probability values for a label corresponding to a plurality of character strings within the soft max layer output by the soft max layer.

According to an embodiment of the disclosure, the second ASR model 320 may output a character string at a second level, based on the output value of the first ASR model 310. According to an embodiment of the disclosure, the second ASR model 320 may include a second encoder 306 that encodes the audio signal such that the second ASR model 320 outputs the character string at the second level, based on the output value of the first ASR model 310. However, the second ASR model 320 may further include a second decoder 308 that determines the character string at the second level corresponding to the audio signal from an output value of the second encoder 306, based on the output value of the first ASR model 310, in addition to the second encoder 306. According to another embodiment of the disclosure, the second ASR model 320 may include only the second decoder 308 that determines the character string at the second level, based on the output value of the first ASR model 310. The second encoder 306 and the second decoder 308 within the second ASR model 320 may be trained such that the second ASR model 320 outputs the character string at the second level.

The second encoder 306 included in the second ASR model 320 may include a plurality of stacked LSTM layers, and the second decoder 308 may include at least one of an attention layer, a projection layer for conversion of the dimension of a hidden layer vector output by the second encoder 306, and a soft max layer. However, the structure of a second ASR model is not limited to an encoder and a decoder.

In other words, according to an embodiment of the disclosure, a second ASR model may include a plurality of LSTM layers that encode an audio signal of a user such that the second ASR model outputs a character string at a second level, similar to a function of an encoder, based on the output value of a first encoder from among the output values of a first ASR model, and a projection layer and a soft max layer that project a hidden layer vector output by at least one of the plurality of LSTM layers and output a character string corresponding to the output value of the projection layer, similar to the function of a decoder, based on information about an ASR result of a first level from among the output values of the first ASR model.

For example, when the second ASR model 320 includes the second encoder 306, the electronic device 1000 may input the output value of the first encoder 302 from among the output values of the first ASR model 310 to the second encoder 306. The electronic device 1000 may encode the audio signal, based on the output value of the first encoder 302, using the second encoder 306. The electronic device 1000 may determine the output value of the second encoder 306, as the output value of the second ASR model 320. In this case, the electronic device 1000 may obtain the character string at the first level from the output value of the second encoder 306, by separately applying a projection layer for converting the dimension of the output value of the second encoder 306 into the dimension of an output value of a soft max layer and the soft max layer for determining a probability value of the output value of the projection layer to the output value of the second encoder 306.

According to another embodiment of the disclosure, when the second ASR model 320 includes the second encoder 306 and the second decoder 308, the electronic device 1000 may input the output value of the first encoder 302 from among the output values of the first ASR model 310 to the second encoder 306, and may input the first ASR result (for example, the character string at the first level) obtained from the output value of the first decoder 304 and the output value of the second encoder 306 to the second decoder 308 of the second ASR model. The electronic device 1000 may determine the output value of the second decoder 308, as the output value of the second ASR model 320.

According to an embodiment of the disclosure, the electronic device 1000 may obtain the character string at the second level from the output value of the second decoder 308, by applying the projection layer and the soft max layer suitable for the format of the output value of the second decoder 308 to the output value of the second decoder 308. However, the aforementioned projection layer and the aforementioned soft max layer may be included in the second decoder 308, and the electronic device 1000 may obtain the character string at the second level from the output value of the second encoder 306 using the second decoder 308.

When the second ASR model 320 includes only the second decoder 308, the second decoder 308 may determine the character string at the second level about the audio signal, based on information about the ASR result of the first level from among the output values of the first ASR model 310 and the output value of the first encoder 302 in the first ASR model 310. In other words, a second ASR model may further include a neural network structure for outputting a character string at a second level that is different from the level of a character string output by a first ASR model, based on the output value of the first ASR model.

Figure 4:
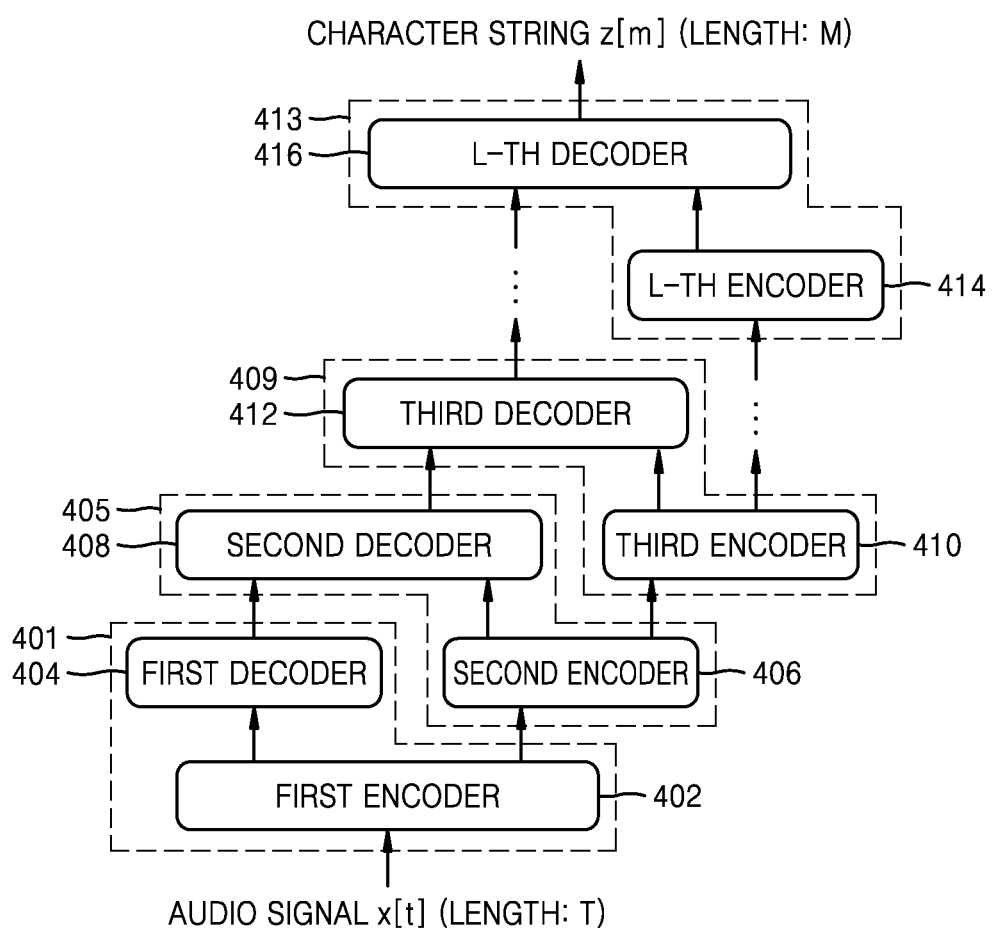
FIG. 4 is a block diagram illustrating an example structure of an ASR model used by an electronic device, according to an embodiment of the disclosure.

FIG. 4 is a block diagram illustrating an example structure of an ASR model used by an electronic device, according to an embodiment of the disclosure.

As shown in FIG. 3, the electronic device 1000 may recognize speech of a user using the first ASR model 310 and the second ASR model 320 stacked on the first ASR model 310. However, according to another embodiment of the disclosure, the electronic device 1000 may recognize speech of a user using more hierarchically-stacked ASR models than a first ASR model and a second ASR model. In other words, the electronic device 1000, as illustrated in FIG. 4, may recognize speech of a user by further using third through L-th ASR models 409 through 413 in addition to a first ASR model 401 and a second ASR model 405.

According to an embodiment of the disclosure, the first ASR model 401, the second ASR model 405, the third ASR model 409, through to the L-th ASR model 413 may include a first encoder 402, a second encoder 406, a third encoder 410, through to an L-th encoder 414, respectively, but the first ASR model 401, the second ASR model 405, the third ASR model 409, through to the L-th ASR model 413 may further include a first decoder 404, a second decoder 408, a third decoder 412, through to an L-th decoder 416, respectively. However, the structure of an ASR model according to the disclosure is not limited to being divided into an encoder and a decoder, and the ASR model may include a neural network model for encoding an audio signal, based on the output value of an ASR model outputting a character string at a lower level, and decoding the encoded audio signal to thereby output a character string at a certain level from the decoded audio signal.

The first ASR model 401, the second ASR model 405, the third ASR model 409, through to the L-th ASR model 413 hierarchically stacked within the electronic device 1000 may output character strings being ASR results of different levels, respectively. According to an embodiment of the disclosure, each of a plurality of hierarchically stacked ASR models in the electronic device 1000 may enable the electronic device 1000 to recognize speech of a user corresponding to an audio signal, based on the output value of an ASR model in a lower layer. Thus, the electronic device 1000 may more accurately recognize the speech of the user.

For example, when the first ASR model 401 includes only the first encoder 402, the electronic device 1000 may determine the output value of the first encoder 402 to be the output value of the first ASR model 401 and may transmit the determined output value of the first ASR model 401 to the second ASR model 405. However, when the first ASR model 401 includes both the first encoder 402 and the first decoder 404, the electronic device 1000 may determine a primary ASR result (for example, the character string at the first level) determined from the output value of the first decoder 404 and the output value of the first encoder 402 to be the output value of the first ASR model 401, and may transmit the determined output value of the first ASR model 401 to the second ASR model 405.

The second ASR model 405 may obtain the character string at the second level corresponding to the audio signal, based on the output value of the first ASR model 401, and may determine, as the output value of the second ASR model 405, at least one of a secondary ASR result (for example, the character string at the second level) and the output value of the second encoder 406 used to recognize the speech of the user. The electronic device 1000 may transmit, to the third ASR model 409, the output value of the second ASR model including at least one of the secondary ASR result and the output value of the second encoder 406.

As described above, an ASR model in an upper layer of the electronic device 1000 according to the disclosure may accurately recognize the speech of the user by transmitting the output value of an encoder within an ASR model in a lower layer trained to output a character string at a low level (for example, a first level) and an ASR result of the lower layer to the ASR model in the upper layer and outputting a character string at a high level (for example, a second level), based on the output value of the encoder within the ASR model in the lower layer and the ASR result of the lower layer.

Figure 5:
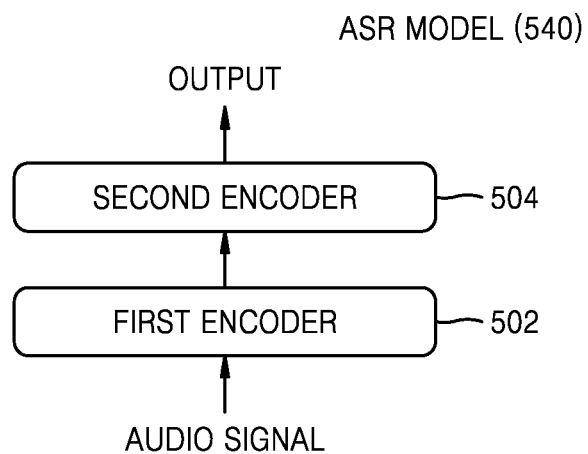
FIG. 5 is a block diagram illustrating an example ASR model used by an electronic device to recognize speech of a user, according to another embodiment of the disclosure.

FIG. 5 is a block diagram illustrating an example ASR model used by an electronic device to recognize speech of a user, according to another embodiment of the disclosure.

As shown in FIGS. 3 and 4, each of a plurality of ASR models in the electronic device 1000 may include an encoder and a decoder. However, according to an embodiment of the disclosure, each of the plurality of ASR models in the electronic device 1000 may include only an encoder. For example, a first ASR model 540 of an electronic device may include a first encoder 502 that encodes an audio signal to output a character string at a first level, and a second ASR model may include only a second encoder 504 that encodes an audio signal to output a character string at a second level. In other words, the electronic device 1000 may recognize speech of a user using an ASR model 540 including only the first encoder 502 and the second encoder 504.

An encoder of an ASR model in the electronic device 1000 may include a plurality of layers, for example, a plurality of stacked LSTM layers. An encoded output value may be one of the output values output by the plurality of layers in the encoder. The encoded output value may be a hidden layer vector output by a layer included in the encoder. The electronic device 1000 may obtain a character string at a first level or a character string at a second level by applying, to the output value of the first or second encoder 502 or 504 within an ASR model 540, a projection layer for converting the dimension of the output value of the first or second encoder 502 or 504 into the dimension of an output value of a soft max layer and the soft max layer for determining a probability value for the output value of the projection layer. According to an embodiment of the disclosure, the first encoder 502 and the second encoder 504 in the ASR model 540 may be trained together by the electronic device 1000 such that a hidden layer vector about the character string at the second level is output, or the first encoder 502 and the second encoder 504 may be separately trained in stages. For example, after the electronic device 1000 trains the first encoder 502 such that a hidden layer vector about the character string at the first level is output, the electronic device 1000 may train the second encoder 504 such that the hidden layer vector about the character string at the second level is output, and thus the hidden layer vector about the character string at the second level may be finally output. The output value of the aforementioned encoder may have the format of a sequence, and may be a sequence of a hidden layer vector being an output value of a neural network layer within the encoder.

For example, when the ASR model 540 includes the first encoder 502 and the second encoder 504, the electronic device 1000 may obtain the character string at the second level from the output value of the second encoder 504, by applying a projection layer and/or a soft max layer suitable for the format of a final output value of the ASR model 540 to the output value of the second encoder 504.

Figure 6:
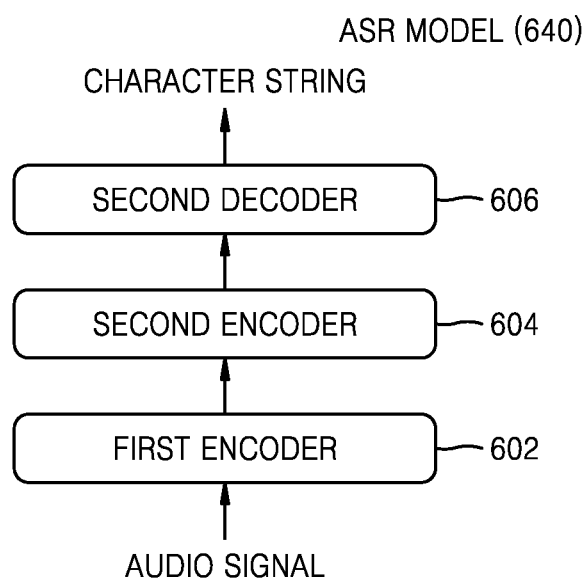
FIG. 6 is a block diagram illustrating an example ASR model used by an electronic device to recognize speech of a user, according to another embodiment of the disclosure.

FIG. 6 is a block diagram illustrating an example ASR model used by an electronic device to recognize speech of a user, according to another embodiment of the disclosure.

As shown in FIGS. 3 and 4, each of a plurality of ASR models in the electronic device 1000 may include an encoder and a decoder. As shown in FIG. 5, each of the plurality of ASR models in the electronic device 1000 may include only an encoder. However, according to an embodiment of the disclosure, the structure of each of the plurality of ASR models in the electronic device 1000 may vary according to the size of the ASR model or the accuracy of targeted ASR.

For example, a first ASR model of the electronic device 1000 may include a first encoder 602, and a second ASR model thereof may include a second encoder 604 and a second decoder 606. In other words, the electronic device 1000 may recognize speech of a user using an ASR model 640 including the first encoder 602, the second encoder 604, and the second decoder 606. Although not shown in FIG. 6, as described above with reference to FIG. 3, the first ASR model of the electronic device 1000 may include the first encoder 602 and a first decoder (not shown), and the second ASR model thereof may include only the second decoder 606.

According to an embodiment of the disclosure, the first encoder 602 in the ASR model 640 may be trained by the electronic device 1000 such that a hidden layer vector about a character string at a first level is output, and the trained first encoder 602 may encode an audio signal using acoustic information about the character string at the first level. The second encoder 604 may encode an audio signal about a character string at a second level using acoustic information about the character string at the second level, based on the output value of the first encoder 602. The second decoder 606 may be trained by the electronic device 1000 such that the character string at the second level is output from the output value of the second encoder 604, which encodes the audio signal, based on the output value of the first encoder 602. According to an embodiment of the disclosure, the first encoder 602, the second encoder 604, and the second decoder 606 may be trained together by the electronic device 1000. However, as will be described in greater detail below, the first encoder 602, the second encoder 604, and the second decoder 606 may be trained in stages such that character strings at different levels are output.

According to another embodiment of the disclosure, the first ASR model may include the first encoder 602 and the first decoder (not shown), and the second ASR model may include only the second decoder 606. When the first ASR model in the electronic device 1000 includes the first encoder 602 and the first decoder (not shown) and the second ASR model therein includes only the second decoder 606, the first encoder 602 encodes an audio signal using acoustic information of the user such that the first ASR model outputs the character string at the first level, and the first decoder (not shown) decodes an encoded audio signal such that the first ASR model outputs the character string at the first level, thereby determining the character string at the first level. The second decoder 606 of the second ASR model may determine the character string at the second level corresponding to the audio signal, based on the output value of the encoder of the first ASR model or information about the character string at the first level output by the first ASR model.

Figure 7:
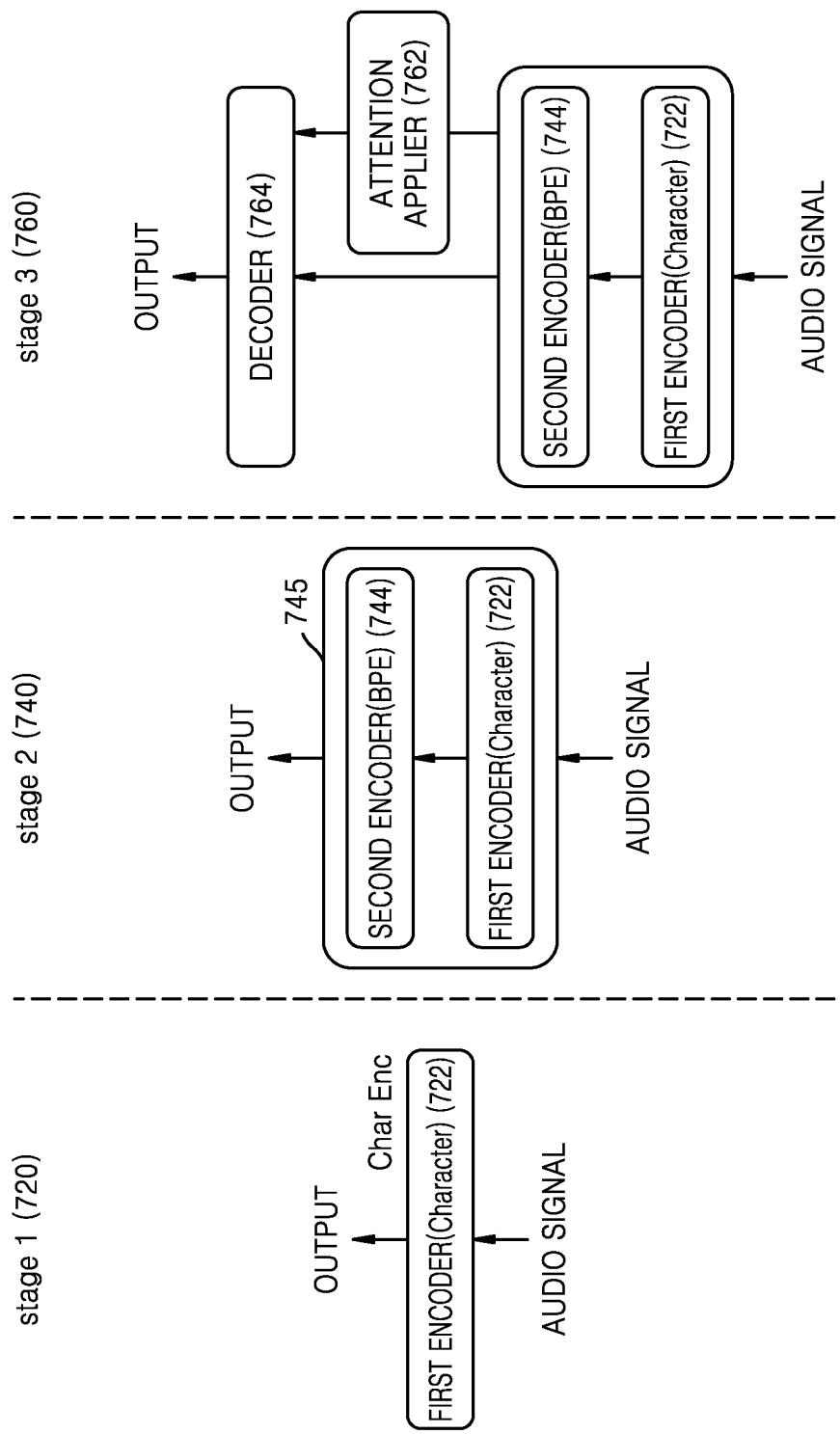
FIG. 7 is a block diagram illustrating an example process of training, in stages, an ASR model for outputting ASR results of different levels, according to an embodiment of the disclosure.

FIG. 7 is a block diagram illustrating an example process of training, in stages, an ASR model for outputting ASR results of different levels, according to an embodiment of the disclosure.

According to an embodiment of the disclosure, the electronic device 1000 may include a plurality of ASR models that output character strings of different levels within the electronic device 1000, and the plurality of ASR models may be hierarchically connected to one another and may be trained together. However, according to an embodiment of the disclosure, the electronic device 1000 may separate and train, in stages, the plurality of ASR models outputting the character strings of different levels. A process in which the electronic device 1000 trains an ASR model including a first encoder 722, a second encoder 744, an attention applier 762, and a decoder 764 in stages will now be described in detail with reference to FIG. 7.

In a first stage 720 of training of FIG. 7, the electronic device 1000 may train the first encoder 722 such that a character string including grapheme-unit sub-strings (for example, h, e, l, l, o, i, a, m, a, t, e, a, c, h, e, and r) is output. For example, the electronic device 1000 may apply a projection layer and a soft max layer to the output value of the training-completed first encoder 722 to thereby obtain a character string at a grapheme level including a plurality of grapheme-unit sub-strings corresponding to an audio signal from the output value of the first encoder 722.

In a second stage 740 of training of FIG. 7, the electronic device 1000 may connect the second encoder 744 to the training-completed first encoder 722 such that a character string including BPE-unit or word-piece-unit sub-strings (for example, hell, o, i, am, a, tea, ch, and er), and then train the first encoder 722 and the second encoder 744 connected to each other. The electronic device 1000 may apply a projection layer and a soft max layer to the output value of the second encoder 744 connected to the first encoder 722 to thereby obtain a character string at a BPE level (e.g., a word-piece level) including a plurality of sub-strings of a BPE unit (e.g., a word-piece unit) corresponding to an audio signal from the output value of the second encoder 744.

In other words, instead of training encoders all at once such that a character string including BPE-unit sub-strings is output, the electronic device 1000 according to an embodiment of the disclosure may first train the first encoder 722 such that character strings at a grapheme level including grapheme-unit sub-strings are output, and then may perform an encoder 745 obtained by stacking the second encoder 744 on the training-completed first encoder 722 such that the encoder 745 outputs a character string at a BPE level.

In a third stage 760 for training of FIG. 7, the electronic device 1000 may further stack the attention applier 762 and the decoder 764 on the second encoder 744 stacked on the training-completed first encoder 722, thereby performing training such that an ASR model including the first encoder 722, the second encoder 744, the attention applier 762, and the decoder 764 outputs a character string at a BPE level as an ASR result. In other words, the electronic device 1000 may train, in stages, encoders for outputting ASR results of different levels, and then stack the trained encoders, to thereby more accurately recognize speech of a user from an audio signal.

Figure 8:
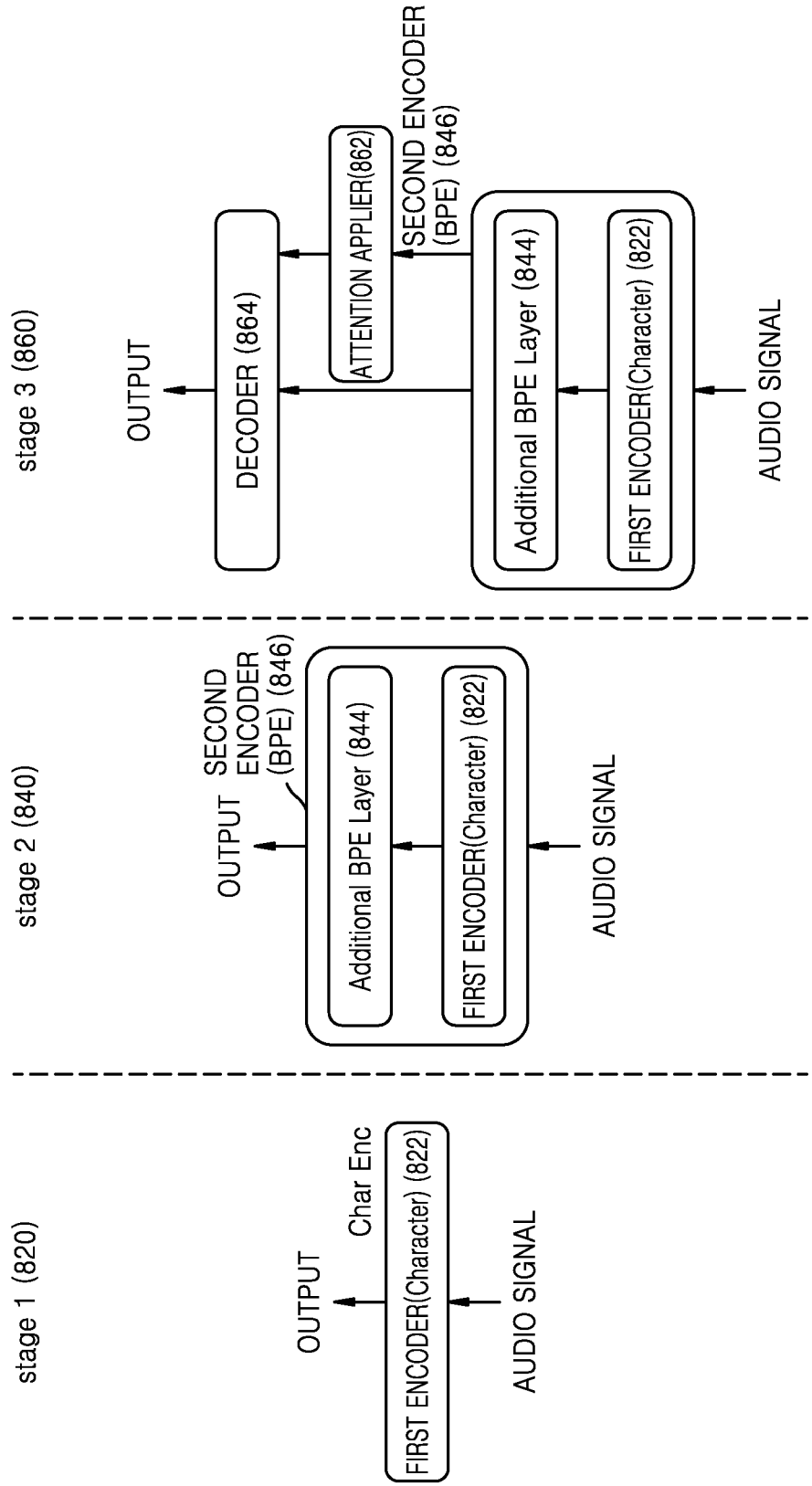
FIG. 8 is a block diagram illustrating an example process of training, in stages, an ASR model for outputting ASR results of different levels, according to another embodiment of the disclosure.

FIG. 8 is a block diagram illustrating an example process of training, in stages, an ASR model for outputting ASR results of different levels, according to another embodiment of the disclosure.

The electronic device 1000 may divide and train a single second encoder 846 in stages such that the second encoder 846 outputs hidden layer vectors about character strings at different levels. For example, in a first stage 820 of training of FIG. 8, the electronic device 1000 may train a first encoder 822 such that a character string at a grapheme level including grapheme-unit sub-strings (for example, h, e, l, l, o, i, a, m, a, t, e, a, c, h, e, and r) is output. A process in which the electronic device 1000 trains the first encoder 822 such that a character string at a grapheme level is output may correspond to the training process illustrated as the first stage 720 of FIG. 7.

In a second stage 840 for training, the electronic device 1000 may stack a plurality of LSTM layers as an additional layer on the training-completed first encoder 822. According to another embodiment of the disclosure, the electronic device 1000 may further stack a plurality of LSTM layers and a max-pooling layer as additional layers on the training-completed first encoder 822. The electronic device 1000 may perform training the second encoder 846, which is obtained by stacking additional layers 844 on the first encoder 822, such that the second encoder 846 outputs hidden layer vectors about a character string at a BPE level. In other words, the second encoder 846 may include the first encoder 822, but may be trained by an electronic device via a separate training process from the process of training the first encoder 822 such that hidden layer vectors about a character string at a grapheme level are output.

In a third stage 860 for training of FIG. 8, the electronic device 1000 may further stack an attention applier 862 and a decoder 864 on the second encoder 846 for which training has been completed in the second stage 840 for training, thereby performing training such that an ASR model including the second encoder 846, the attention applier 862, and the decoder 864 finally outputs a character string at a BPE level as an ASR result.

In other words, as shown in FIG. 7, the electronic device 1000 may separate and train a plurality of encoders such that hidden layer vectors about character strings at different levels are output, and may separate and train some of a plurality of LSTM layers within one encoder such that hidden layer vectors about character strings at different levels are output. The electronic device 1000 may separate and train, in stages, an encoder and a decoder within an ASR model or a plurality of neural network layers within the encoder or the decoder such that character strings at different levels are output, and thus may accurately recognize speech of a user within an audio signal.

Figure 9:
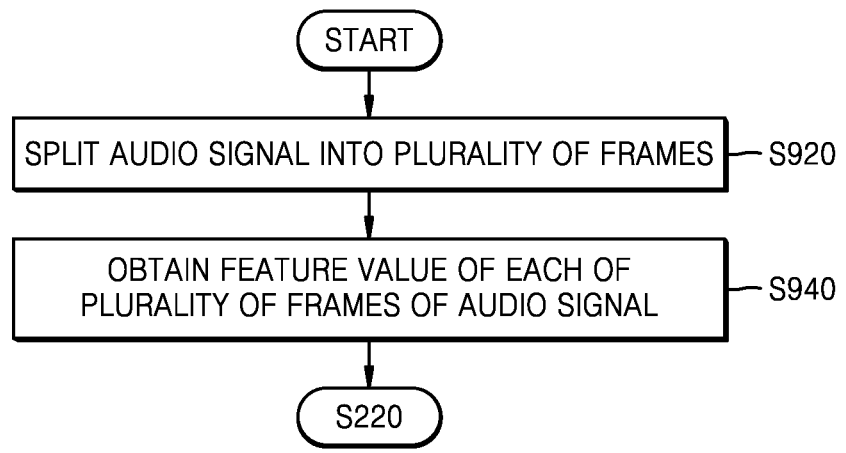
FIG. 9 is a flowchart illustrating an example method, performed by an electronic device, of obtaining an audio signal, according to an embodiment of the disclosure.

FIG. 9 is a flowchart illustrating an example method, performed by the electronic device 1000, of obtaining an audio signal, according to an embodiment of the disclosure.

In operation S920, the electronic device 1000 may split an audio signal in units of frames. For example, the electronic device 1000 may determine a window length of a certain window and may split the audio signal into a plurality of frames using windows each having the determined window length. According to an embodiment of the disclosure, the electronic device 1000 may overlap the windows at regular intervals of a window, and may split the audio signal into a plurality of frames using the windows overlapped at regular intervals.

In operation S940, the electronic device 1000 may obtain a feature value of each of the plurality of frames of the audio signal. For example, the electronic device 1000 may obtain the feature value of each of the plurality of frames of the audio signal, and may input the obtained feature values of the audio signal to an ASR model, to thereby recognize speech of a user within the audio signal. According to an embodiment of the disclosure, the electronic device 1000 may extract the feature values of the plurality of frames of the audio signal in the form of vectors. The electronic device 1000 may recognize the speech of the user within the audio signal by inputting a feature vector of the audio signal extracted in units of frames to the ASR model.

Figure 10:
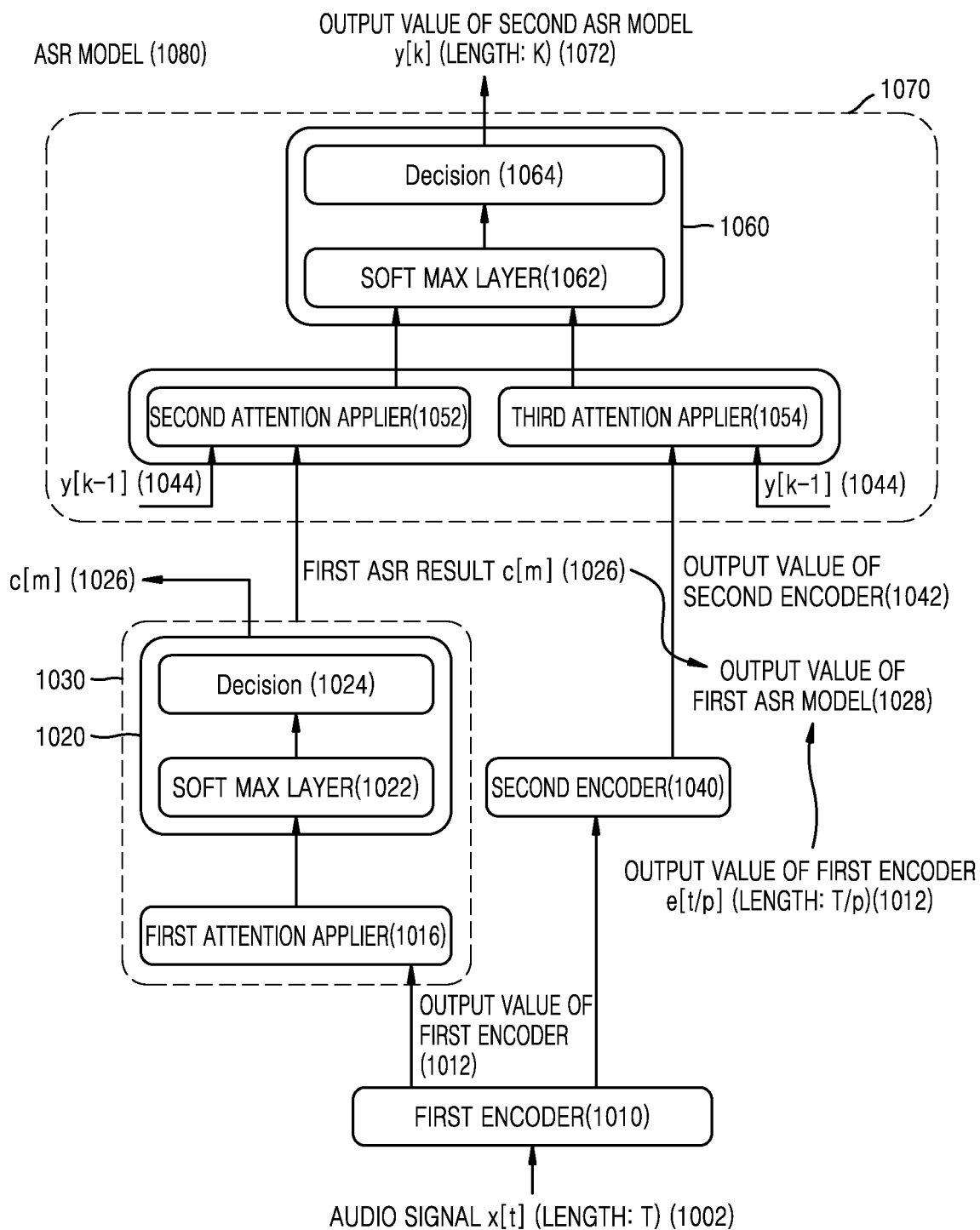
FIG. 10 is a block diagram illustrating an example structure of an ASR model used by an electronic device, according to an embodiment of the disclosure.

FIG. 10 is a block diagram illustrating an example structure of an ASR model used by an electronic device, according to an embodiment of the disclosure.

As described above with reference to FIG. 3, according to an embodiment of the disclosure, the electronic device 1000 may include the first ASR model 310 and the second ASR model 320 in order to recognize speech of a user. A process in which the electronic device 1000 recognizes speech of a user from an audio signal will now be described based on the structures of the first ASR model 310 and the second ASR model 320 according to an embodiment of the disclosure.

According to an embodiment of the disclosure, the first ASR model 310 may include a first encoder 1010 and a first decoder 1030. According to an embodiment of the disclosure, the first ASR model 310 may output a character string at a first level that is different from a second level, by recognizing the speech of the user from the audio signal. According to an embodiment of the disclosure, when the character string at the first level includes grapheme-unit sub-strings (for example, h, e, l, l, o, i, a, m, a, t, e, a, c, h, e, and r), the character string at the second level may include BPE-unit sub-strings (for example, hell, o, i, am, a, tea, ch, and er) or word-unit sub-strings (for example, hello, i, am, a, and teacher).

However, embodiments of the disclosure are not limited thereto, and, when the character string at the first level includes phoneme-unit sub-strings, the character string at the second level may include grapheme-unit sub-strings, BPE-unit sub-strings, or word-unit sub-strings. In other words, sub-strings within the character string at the second level output by the second ASR model may include other text units closer to a semantically-completed word than sub-strings within the character string at the first level output by the first ASR model.

The first encoder 1010 may encode an audio signal 1002 such that the first ASR model 310 outputs the character string at the first level. According to an embodiment of the disclosure, the first encoder 1010 may receive and encode the feature values of the plurality of frames of the audio signal. The first encoder 1010 may transmit, to the first decoder 1030, an output value of the first encoder 1010 generated by encoding the feature values of the plurality of frames of the audio signal.

According to an embodiment of the disclosure, the first encoder 1010 may include a plurality of stacked LSTM layers. However, according to an embodiment of the disclosure, the first encoder 1010 may further include max pooling layers for selecting some frames from among frames of which dimensions have been changed via the LSTM layers, according to a sub-sampling factor. According to an embodiment of the disclosure, the output value of the first encoder 1010 may include a sequence of hidden layer vectors output by LSTM layers selected from the plurality of stacked LSTM layers included in the first encoder 1010. A process in which the first encoder 1010 encodes the audio signal 1002 will be described in greater detail below with reference to FIG. 11.

According to an embodiment of the disclosure, the first decoder 1030 may include a first attention applier 1016 and a first output layer 1020. However, according to another embodiment of the disclosure, the first decoder 1030 may include only the first attention applier 1016, or may include only the first output layer 1020. In other words, some of the components included in the first decoder 1030 may be omitted according to the size of a targeted first ASR model or ASR accuracy. When the first decoder 1030 includes only the first attention applier 1016, the electronic device 1000 may obtain the character string at the first level from the output value of the first decoder 1030 by applying a projection layer and a soft max layer to the output value of the first decoder 1030.

When the first decoder 1030 includes only the first output layer 1020, the first decoder 1030 may determine the character string at the first level from the output value of the first encoder 1010, by directly applying a projection layer for converting the dimension of a hidden layer vector output by the first encoder 1010 and a soft max layer. However, when the first decoder 1030 includes both the first attention applier 1016 and the first output layer 1020, the first decoder 1030 may determine the character string at the first level corresponding to an audio signal, by decoding the output value of the first encoder 1010, based on the output value of the first encoder 1010 and an output value of first decoder 1030 at a previous time.

For example, the first decoder 1030 may decode the output value of the first encoder 1010 such that the first ASR model 310 obtains the character string at the first level from the output value of first decoder 1030. The first ASR model 310 may obtain the character string at the first level from the output value of the first decoder 1030, and may output the character string at the first level as the output value of the first ASR model 310.

According to an embodiment of the disclosure, an operation, performed by the first decoder 1030, of decoding the output value of the first encoder 1010 may correspond to an operation of outputting a label within a soft max layer corresponding to a highest probability to a first context vector generated by performing weighted summation on the output values of the first encoder 1010, according to an attention determined in an attention layer within the first decoder 1030.

As will be described in greater detail below, the first attention applier 1016 may further include a plurality of stacked LSTM layers, and an attention layer for applying an attention to the output value of the first encoder 1010, based on the output value of the first decoder 1030 at a previous time. For example, the first attention applier 1016 may determine attentions to be applied to the output values of the first encoder 1010, and may apply the determined attentions to the output values of the first encoder 1010 to thereby output the first context vector.

For example, the first attention applier 1016 may apply an attention to the hidden layer vectors output by one or more LSTM layers within the first encoder 1010, based on a correlation between the first encoder 1010 and the first decoder 1030, and may generate a first context vector by performing weighted summation on the attention-applied hidden layer vectors. A detailed operation of the first attention applier 1016 will be described in greater detail below with reference to FIG. 12.

The first output layer 1020 may include a soft max layer 1022 and a decision layer 1024. However, embodiments of the disclosure are not limited thereto, and the first output layer 1020 may further include, in addition to the soft max layer 1022 and the decision layer 1024, a projection layer or fully-connected layer for converting the format of a first context into a format corresponding to a certain label within the soft max layer 1022. The first output layer 1020 may receive the first context vector from the first attention applier 1016, convert the dimension of the first context vector into the dimension of a soft max output value, determine a probability value that a first context vector of which dimension has been converted corresponds to a label within the soft max layer 1022, and output, as an ASR result, a label corresponding to the first context vector at a highest probability. In other words, the first ASR model 310 may output the character string at the first level, using the label output by the first output layer 1020.

The soft max layer 1022 may determine a probability value that the first context vector output by the first attention applier 1016 corresponds to a certain label within the soft max layer 1022. For example, the soft max layer 1022 may receive an output value in a hidden state output by the first decoder 1030 at a previous time, a context vector at a current time output by the first attention applier 1016, and information about a character string output at a previous time by the soft max layer 1022, and may determine a probability value that the first context vector output by the first attention applier 1016 corresponds to a certain text label such as 'Hi Bixby' or 'Hello'. According to an embodiment of the disclosure, the soft max layer 1022 may further include a projection layer for converting the dimension of the first context vector output by the first attention applier 1016 into the dimension of the output value of the soft max layer 1022.

Based on the probability value determined by the soft max layer 1022, at which the first context vector is to correspond to a certain label, the decision layer 1024 may output a character string at a first level corresponding to the label. According to an embodiment of the disclosure, based on probability values that the first context vectors output by the soft max layer 1022 correspond to certain labels within the decision layer 1024, the decision layer 1024 may output a character string at a first level corresponding to a label within the soft max layer 1022 representing a highest probability value.

The first ASR model 310 may determine the output value 1012 of the first encoder 1010 to be an output value 1028 of the first ASR model 310, but may determine the output value 1012 of the first encoder 1010 and a first ASR result 1026 including the character string at the first level to be the output value 1028 of the first ASR model 310. In other words, the output value 1028 of the first ASR model 310 may include the output value 1012 of the first encoder 1010, or may include both the output value 1012 of the first encoder 1010 and the first ASR result 1026.

According to an embodiment of the disclosure, the second ASR model 320 may output the character string at the second level for the audio signal, based on the output value of the first ASR model 310. The second ASR model 320 may include a second encoder 1040 and a second decoder 1070. The second ASR model 320 may output the character string at the second level, by recognizing the speech of the user from the audio signal. The second encoder 1040 may encode the audio signal such that the second ASR model 320 outputs the character string at the second level. According to an embodiment of the disclosure, the second encoder 1040 may encode the feature values of the plurality of frames of the audio signal, based on the output value of the first encoder 1010 that encodes the audio signal such that the first ASR model 310 outputs the character string at the first level. In other words, the second encoder 1040 may encode feature values of a plurality of frames of the audio signal 1002 based on the output value 1028 of the first ASR model, such that the second ASR model 320 outputs the character string at the second level, and thus the second ASR model 320 may more accurately output the character string at the second level using an output value of the second encoder 1040.

The second encoder 1040 may transmit, to the second decoder 1070, an output value 1042 of the second encoder 1040 generated by encoding the feature values of the plurality of frames of the audio signal 1002. According to an embodiment of the disclosure, the output value 1042 of the second encoder 1040 may include a sequence of hidden layer vectors output by LSTM layers selected from a plurality of stacked LSTM layers included in the second encoder 1040. According to an embodiment of the disclosure, the second encoder 1040 may include a plurality of stacked LSTM layers, and may further include max pooling layers for selecting some frames from among frames of which dimensions have been converted via the plurality of LSTM layers, according to a sub-sampling factor.

The second encoder 1040 may encode an audio signal, based on the output value 1012 of the first encoder 1010 or the output value 1028 of the first ASR model 310 including the output value 1012 of the first encoder 1010, such that the second ASR model 320 outputs the character string at the second level as a more accurate ASR result.

According to an embodiment of the disclosure, the output value 1012 of the first encoder 1010 may include acoustic information about a user acoustic feature at a first level, and, because the second encoder 1040 encodes the audio signal 1002, based on the acoustic information at the first level included in the output value 1012 of the first encoder 1010, the second encoder 1040 may encode the audio signal 1002 such that an acoustic feature of the user is more well reflected. Accordingly, the second ASR model 320 may encode the audio signal 1002 such that an acoustic feature of the user is better reflected based on the output values of a plurality of encoders in which the acoustic feature of the user has been reflected in stages. A process in which the second encoder 1040 encodes the audio signal 1002 will now be described in greater detail below with reference to FIG. 11.

According to an embodiment of the disclosure, the second decoder 1070 may include a second attention applier 1052, a third attention applier 1054, and a second output layer 1060. However, according to another embodiment of the disclosure, the second decoder 1070 may include only the third attention applier 1054 and may not include the second attention applier 1052. According to an embodiment of the disclosure, the second decoder 1070 may include only the second attention applier 1052 and the third attention applier 1054, and may not include the second output layer 1060. As described above with reference to FIG. 3, the second decoder 1070 may further include an arbitrary deep neural network (DNN) model for outputting a character string at a second level for an audio signal, based on the output value of the first ASR model 310. In other words, some of the components included in the second decoder 1070 may be omitted according to the size of a targeted second ASR model.

According to an embodiment of the disclosure, when the second decoder 1070 includes only both the second attention applier 1052 and the third attention applier 1054, the electronic device 1000 may obtain the character string at the second level from the output value of the second decoder 1070 by applying a projection layer or a soft max layer to the output value of the second decoder 1070. However, when the second decoder 1070 includes all of the second attention applier 1052, the third attention applier 1054, and the second output layer 1060, the electronic device 1000 may obtain the character string at the second level from the output value of the second output layer 1060.

The second decoder 1070 determines the character string at the second level corresponding to the audio signal 1002 by decoding the output value of the second encoder 1040, based on the first ASR result and the output value of the first encoder 1010. For example, the second decoder 1070 may decode the output value of the second encoder 1040, based on the first ASR result 1026 within the output value of the first ASR model 310 and the output value 1042 of the second encoder 1040 obtained via encoding based on the output value of the first encoder 1010, such that the second ASR model 320 outputs the character string at the second level. In other words, the second ASR model 320 may obtain the character string at the second level from an output value of the second decoder 1070, and may output the character string at the second level as the output value of the second ASR model 320.

According to an embodiment of the disclosure, an operation, performed by the second decoder 1070, of decoding the output value of the second encoder 1040 may correspond to an operation of outputting a label within a soft max layer that corresponds, at a highest probability, to a third context vector generated by performing weighted summation on output values of the second encoder 1040 according to an attention determined in an attention layer within the third attention applier 1054. According to another embodiment of the disclosure, an operation, performed by the second decoder 1070, of decoding the first ASR result and the output value of the second encoder 1040 may correspond to an operation of outputting a label within a soft max layer that corresponds, at a highest probability, to a concatenated vector of a second context vector generated by weighted-summing the first ASR result 1026 according to an attention determined by the second attention applier 1052 and the third context vector. The concatenated vector of the second and third context vectors may be a vector obtained by concatenating the second context vector and the third context vector according to an attention.

As will be described in greater detail below, the second attention applier 1052 may further include a plurality of stacked LSTM layers, and an attention layer for applying an attention to the first ASR result 1026, based on an output value 1044 of the second decoder 1070 at a previous time. For example, the second attention applier 1052 may determine attentions to be applied to the first ASR result 1026, and may output the second context vector by applying the determined attentions to the first ASR result 1026. According to an embodiment of the disclosure, the second attention applier 1052 may apply the attentions to first ASR result values, based on a correlation between the second encoder 1040 and the second decoder 1070, and may generate the second context vector by weighted-summing the first ASR result values to which the attentions have been applied.

As will be described in greater detail below, the third attention applier 1054 may further include a plurality of stacked LSTM layers, and an attention layer for applying an attention to the output value 1042 of the second encoder 1040, based on the output value 1044 of the second decoder 1070 at a previous time. For example, the third attention applier 1054 may determine attentions to be applied to the output values 1042 of the second encoder 1040, and may output the third context vector by applying the determined attentions to the output values 1042 of the second encoder. According to an embodiment of the disclosure, the third attention applier 1054 may apply attentions to the output values 1042 of the second encoder 1040, based on the correlation between the second encoder 1040 and the second decoder 1070, and may generate the third context vector by weighted-summing the output values 1042 of the second encoder 1040 to which attentions have been applied.

The second output layer 1060 may include a soft max layer 1062 and a decision layer 1064. However, embodiments of the disclosure are not limited thereto, and the second output layer 1060 may further include, in addition to the soft max layer 1062 and the decision layer 1064, a projection layer or fully-connected layer for converting the dimension of the second context vector, the third context vector, or the concatenated vector of the second and third context vectors into the dimension of an output value of the soft max layer 1062.

The second output layer 1060 may receive the second context vector and the third context vector respectively output by the second attention applier 1052 and the third attention applier 1054, and may output a label that corresponds to the second context vector and the third context vector at a highest probability. However, according to another embodiment of the disclosure, when the second decoder 1070 includes only the third attention applier 1054, the second decoder 1070 may receive the third context vector and may output a label that corresponds to the third context vector at a highest probability. The second ASR model 320 may output the character string at the second level, using a label corresponding to a highest probability value determined by the second output layer 1060.

The soft max layer 1062 may determine probability values that the second context vector output by the second attention applier 1052 and the third context vector output by the third attention applier 1054 correspond to certain labels within the soft max layer 1062. According to an embodiment of the disclosure, the soft max layer 1062 may determine a probability value that the concatenated vector of the second and third context vectors corresponds to a certain label within the soft max layer 1062.

For example, the soft max layer 1062 may determine the probability values that the second context vector and the third context vector correspond to certain labels, based on an output value in a hidden state output at a previous time by the second decoder 1070, a second context vector at a current time, a third context vector at a current time, and information about a character string output at a previous time by the soft max layer 1062.

The decision layer 1064 may output a character string at a second level corresponding to a particular label, based on the probability values that the second context vector and the third context vector output by the soft max layer 1062 correspond to the certain labels According to an embodiment of the disclosure, the decision layer 1064 may determine probability values that the second and third context vectors output by the soft max layer 1062 correspond to certain labels within the decision layer 1064, and may output a character string at a second level corresponding to a label representing a highest probability value.

The second ASR model 320 may determine the output value 1042 of the second encoder 1040 to be an output value 1072 of the second ASR model 320, or may determine the output value 1042 of the second encoder 1040 and a second ASR result determined from the output value of the second decoder 1070 to be the output value 1072 of the second ASR model 320. In other words, the output value 1072 of the second ASR model 320 may include the output value 1042 of the second encoder 1040, or may include both the output value 1042 of the second encoder 1040 and the second ASR result.

According to an embodiment of the disclosure, the second ASR result may include the output value of the second decoder 1070. According to an embodiment of the disclosure, when the second decoder 1070 does not include the second output layer 1060, the output value of the second decoder 1070 may include a sequence of the second context vector generated based on the attention determined by the attention layer included in the second attention applier 1052 and the third context vector generated based on the attention determined by the attention layer included in the third attention applier 1054.

However, according to another embodiment of the disclosure, when the second decoder 1070 does not include the second attention applier 1052 and the second output layer 1060 and includes only the third attention applier 1054, the output value of the second decoder 1070 may include only the sequence of the third context vector generated based on the attention determined by the attention layer included in the third attention applier 1054.

According to an embodiment of the disclosure, when the second decoder 1070 includes all of the second attention applier 1052, the third attention applier 1054, and the second output layer 1060, the output value of the second decoder 1070 may include probability values of the second context vector and the third context vector with respect to labels within the soft max layer 1062 of the second output layer 1060 or information about a label that corresponds, at highest probabilities, to the second context vector and the third context vector.

According to the above-described embodiment of the disclosure, when the second decoder 1070 does not include the second attention applier 1052, the second ASR model 320 may recognize speech of a user at the second level, based on the output value 1012 of the first encoder 1010 including acoustic information at the first level. However, according to another embodiment of the disclosure, when the second decoder 1070 includes both the second attention applier 1052 and the third attention applier 1054, the second ASR model 320 may recognize the speech of the user at the second level, based on both the output value 1042 of the second encoder 1010 to which an attention has been applied by the second decoder 1070 and the ASR result 1026 of the first ASR model 310. Thus, the second ASR model 320 may more accurately recognize speech of a user by determining the character string at the second level within the audio signal, based on both acoustic information of the user and linguistic information at the first level.

Figure 11:
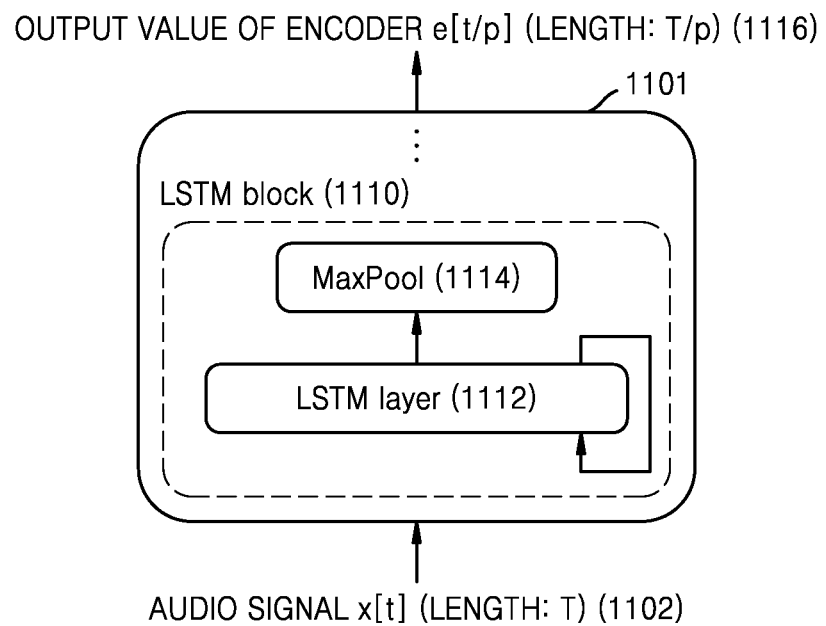
FIG. 11 is a block diagram illustrating an example encoder within an ASR model according to an embodiment of the disclosure.

FIG. 11 is a block diagram illustrating an example encoder within an ASR model according to an embodiment of the disclosure in greater detail.

According to an embodiment of the disclosure, an encoder 1101 within an ASR model used by the electronic device 1000 may include a plurality of stacked LSTM layers 1112, and max pooling layers 1114 for selecting some frames from among frames of which dimensions have been converted by the plurality of stacked LSTM layers 1112, according to a sub sampling factor. However, embodiments of the disclosure are not limited to max pooling for selecting some frames according to a sub sampling factor, and the encoder 1101 may further include layers for average pooling or the other type of pooling in order to pool some frames from among dimension-changed frames. The max pooling layers 1114 from among the components of the encoder 1101 shown in FIG. 11 may be omitted according to embodiments of the disclosure. The encoder 1101 within an ASR model used by the electronic device 1000 may include a convolutional neural network other than the LSTM layers 1112, and may further include a DNN-based network.

The encoder 1101 may convert the dimensions of frames of an audio signal 1102 input to the electronic device 1000, by applying non-linearity to the frames. For example, when 100 frames of a 40 dimension are input to the electronic device 1000, the encoder 1101 may convert the dimension of each of the 100 frames into a 1024 dimension using an LSTM layer. The encoder 1101 may output only some frames from among the input frames by selecting a certain percentage of frames from among dimension-converted frames, using at least one of the max pooling layers 1114, an average pooling layer, and a pooling layer for performing other pooling algorithms, as indicated by reference numeral 1116.

For example, it is assumed that the encoder 1101 includes 4 pairs of LSTM blocks 1110. Each of the LSTM blocks 1110 may include a LSTM layer 1112 and a max pooling layer 1114. The LSTM layer 1112 and the max pooling layer 1114 may constitute a single LSTM block within the encoder 1101, and thus the encoder 1101 may include a total of four LSTM blocks. For example, when 8 frames having an m dimension are sequentially input to the encoder 1101, non-linearity is applied to each of the 8 frames by the LSTM layer 1112, and thus each of the 8 frames may be converted from the m dimension into another dimension and output to the max pooling layer 1114. When a sub sampling factor is set to be 2, the max pooling layer 1114 may select a frame representing a larger audio feature from among audio features of two frames at a 1/2 ratio.

Accordingly, the encoder 1101 including the total of four LSTM blocks may receive 8 frames of the m dimension, and output one frame having a different frame from the m dimension, from among the received 8 frames of the m dimension. Because the dimension of a frame output by the encoder 1101 receiving 8 frames of the m-dimension is not recognized due to the non-linearity of the LSTM layer 1112, the dimension may be a hidden dimension.

However, an encoder within an ASR model is not limited to the structure of the encoder 1101 of FIG. 11, and the structure of the encoder 1101 may vary according to the size of the ASR model or the accuracy of targeted ASR. For example, as described above, the encoder 1101 may include only the LSTM layers 1112 or CNN layers, or may include a single max pooling layer at the last end of the plurality of stacked LSTM layers 1112. According to an embodiment of the disclosure, the structure of an encoder of each of a plurality of ASR models that output character strings at different levels may vary. For example, an encoder within a first ASR model may include only a plurality of LSTM layers, and an encoder within a second ASR model may include a plurality of stacked LSTM layers, and max pooling layers for selecting some frames from among frames of which dimensions have been converted by the plurality of stacked LSTM layers.

Figure 12:
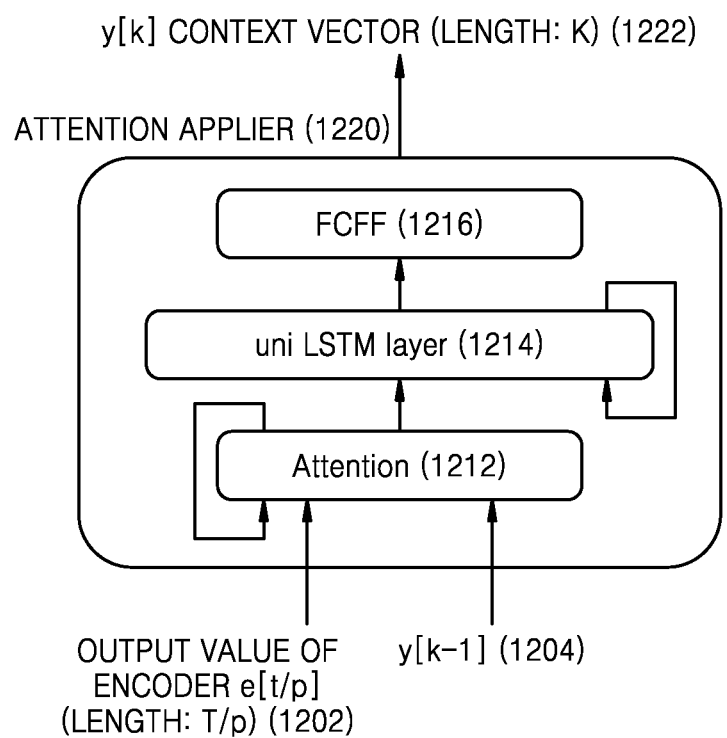
FIG. 12 is a block diagram illustrating an example attention applier within an ASR model according to an embodiment of the disclosure.

FIG. 12 is a block diagram illustrating an example attention applier 1220 within an ASR model according to an embodiment of the disclosure in greater detail.

The attention applier 1220 within the ASR model used by the electronic device 1000 may include an attention layer 1212, a plurality of stacked LSTM layers 1214, and a fully connected feed forward (FCFF) layer 1216. However, embodiments of the disclosure are not limited to the structure of the attention applier 1220 of FIG. 12, and some of the components illustrated in FIG. 12 may be omitted. For example, when the electronic device 1000 includes a plurality of attention appliers, the plurality of attention appliers may include only attention layers, and the attention appliers including only the attention layers may share a plurality of stacked LSTM layers 1214 and FCFF layers 1216 that are located outside the attention appliers.

According to an embodiment of the disclosure, the attention applier 1220 may generate a context vector 1222 by applying an attention to an output value of an encoder 1202 or an ASR result of a lower level 1204 that is input to the attention applier 1220.

According to an embodiment of the disclosure, the attention layer 1212 may determine an attention to be applied to the ASR result at the lower level, based on the output value of the encoder and a context vector at a previous time output by the attention applier 1220, and may apply the determined attention to the output value of the encoder or the ASR result of the lower level. The attention layer 1212 may weighted-sum the output value of the encoder or the ASR result of the lower level according to the determined attention, by applying the determined attention to the output value of the encoder or the ASR result of the lower level.

According to an embodiment of the disclosure, the attention layer 1212 may determine the attention that is to be applied to the output value of the encoder or the ASR result of the lower level, using a hidden layer vector in a hidden dimension state output by the encoder and an attention weight feedback determined by the attention layer 1212. As described above, the attention layer 1212 may determine the attention, based on the output value at a previous time output by a decoder including an attention applier.

The LSTM layers 1214 may convert the dimension of a frame within a weighted-summed output value of the encoder or a weighted-summed ASR result of the lower level output by the attention layer 1212. According to an embodiment of the disclosure, the LSTM layers 1214 may correspond to the LSTM layers within the encoder 1101 of FIG. 11. For example, the LSTM layers 1214 of the attention applier 1220 may convert the dimension of a frame by applying non-linearity to an output value of the encoder or an ASR result of the lower level that is output in units of frames. The LSTM layers 1214 of the attention applier 1220 may be uni-directional LSTM layers, but embodiments of the disclosure are limited thereto. The LSTM layers 1214 of the attention applier 1220 may include bi-directional LSTM layers.

The FCFF layer 1216 may be fully connected to an output terminal of the LSTM layers 1214, and thus may transmit the dimension-converted weighted-summed output value of the encoder or the dimension-converted weighted-summed ASR result of the lower level to an output layer of the ASR model. For example, the FCFF layer 1216 may transmit the weighted-summed output value of the encoder or the weighted-summed ASR result of the lower level output by the LSTM layers 1214 in only a direction toward the output terminal, thereby connecting the weighted-summed output value of the encoder or the weighted-summed ASR result of the lower level to a certain label included in a soft max layer within the output layer.

According to an embodiment of the disclosure, the LSTM layers 1214 and the FCFF layer 1216 of FIG. 12 may be included in each of the second attention applier 1052 and the third attention applier 1054 of FIG. 10. In other words, the electronic device 1000 may input the second context vector generated according to the attention determined by the attention layer in the second attention applier 1052 and the third context vector generated according to the attention determined by the attention layer in the third attention applier 1054 to the LSTM layers and the FCFF layers included in each of the second attention applier 1052 and the third attention applier 1054, and may transmit the output value of the second attention applier 1052 and the output value of the third attention applier 1054 to the second output layer 1060.

However, according to another embodiment of the disclosure, the second attention applier 1052 and the third attention applier 1054 may not include the LSTM layers 1214 and the FCFF layer 1216 of FIG. 12, and may share LSTM layers 1214 and an FCFF layer 1216 that are located outside the second attention applier 1052 and the third attention applier 1054. In other words, the electronic device 1000 may transmit the second context vector generated according to the attention determined by the attention layer in the second attention applier 1052 and the third context vector generated according to the attention determined by the attention layer in the third attention applier 1054 to the LSTM layers and the FCFF layers shared by the second attention applier 1052 and the third attention applier 1054, such that a character string is output based on a probability value that output values output via the LSTM layers and the FCFF layers correspond to a label within a soft max layer.

When the LSTM layers and the FCFF layers are included in the second output layer 1060 of FIG. 10, the electronic device 1000 may transmit the second context vector generated according to the attention determined by the attention layer in the second attention applier 1052 and the third context vector generated according to the attention determined by the attention layer in the third attention applier 1054 directly to the second output layer 1060, such that a label within the soft max layer that corresponds to the second context vector and the third context vector at a highest probability is output.

Figure 13:
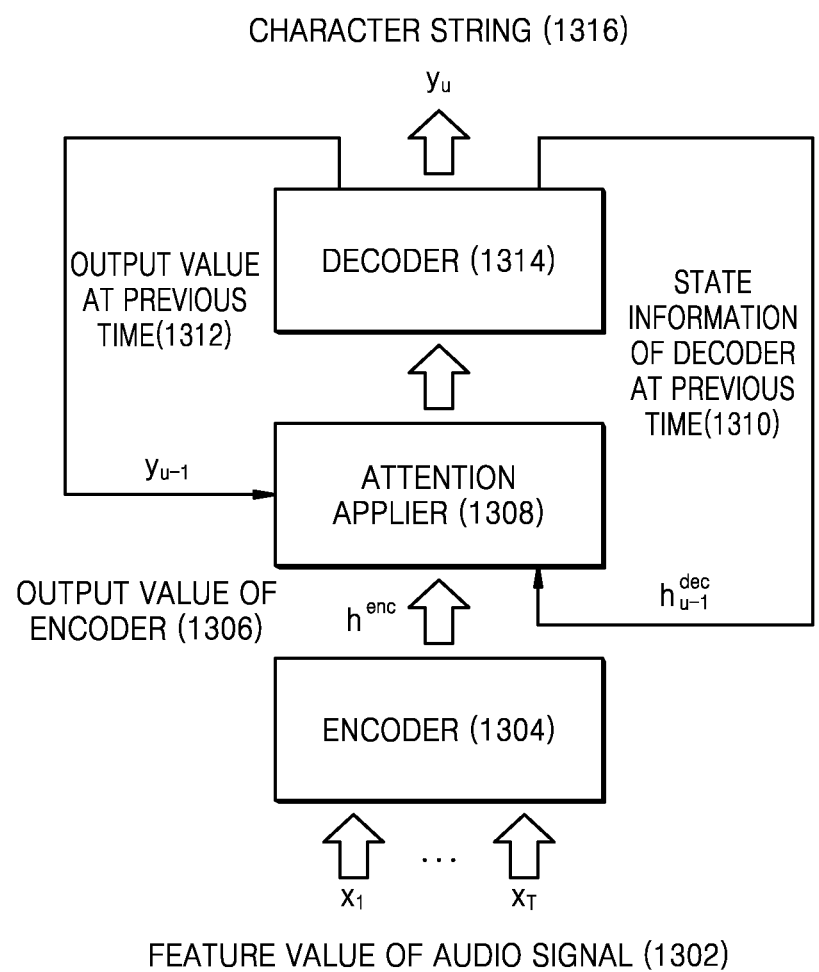
FIG. 13 is a block diagram illustrating an example structure of an attention-based ASR model according to an embodiment of the disclosure.

FIG. 13 is a block diagram illustrating an example structure of an attention-based ASR model according to an embodiment of the disclosure.

According to an embodiment of the disclosure, an ASR model used by the electronic device 1000 may be an attention-based end-to-end neural network model. According to an embodiment of the disclosure, the ASR model used by the electronic device 1000 may include an encoder 1304, an attention applier 1308, and a decoder 1314.

For example, the encoder 1304 may obtain and encode a feature value 1302 of an audio signal in units of frames. The encoder 1304 may include a plurality of LSTM layers and a max pooling layer, and may encode the feature value 1302 of the input audio signal input in units of frames, by converting the dimension of the frames via application of non-linearity to the feature value 1302 of the audio signal and selecting a certain percentage of frames from among the frames having the converted dimension.

The attention applier 1308 may include a plurality of attention layers. The attention applier 1308 may generate a context vector by determining an attention to be applied to output values 1306 of the encoder 1304 and weighted-summing the output values 1306 of the encoder 1304 according to the determined attention. According to an embodiment of the disclosure, the attention applier 1308 may determine attentions, based on an output value at a previous time 1312 of a decoder 1314 and state information 1310 of the decoder 1314 at a previous time, and may apply the determined attentions to the output values 1306 of the encoder 1304.

The decoder 1314 may decode a weighted-summed value output by the attention applier 1308. For example, the decoder 1314 may include at least one LSTM layer. The decoder 1314 may convert the dimension of a context vector at a previous time by applying non-linearity to the context vector at the previous time, based on a context vector at a current time output by the attention applier 1308 and a recurrent state of the at least one LSTM layer in the decoder 1314. Because an output value of the decoder 1314 is not recognized due to the non-linearity of the at least one LSTM layer, the output value may be in a hidden dimension state.

According to an embodiment of the disclosure, the decoder 1314 may include an output layer including a soft max layer or a projection layer, and may output certain character strings 1316 from a decoded context vector.

Figure 14:
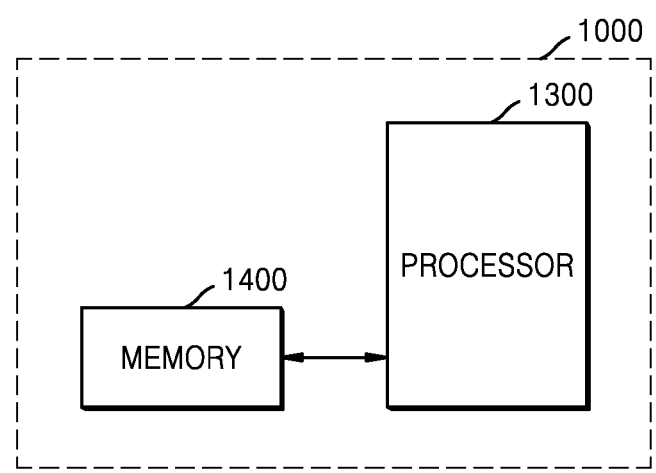
FIG. 14 is a block diagram illustrating an example electronic device according to an embodiment of the disclosure.
Figure 15:
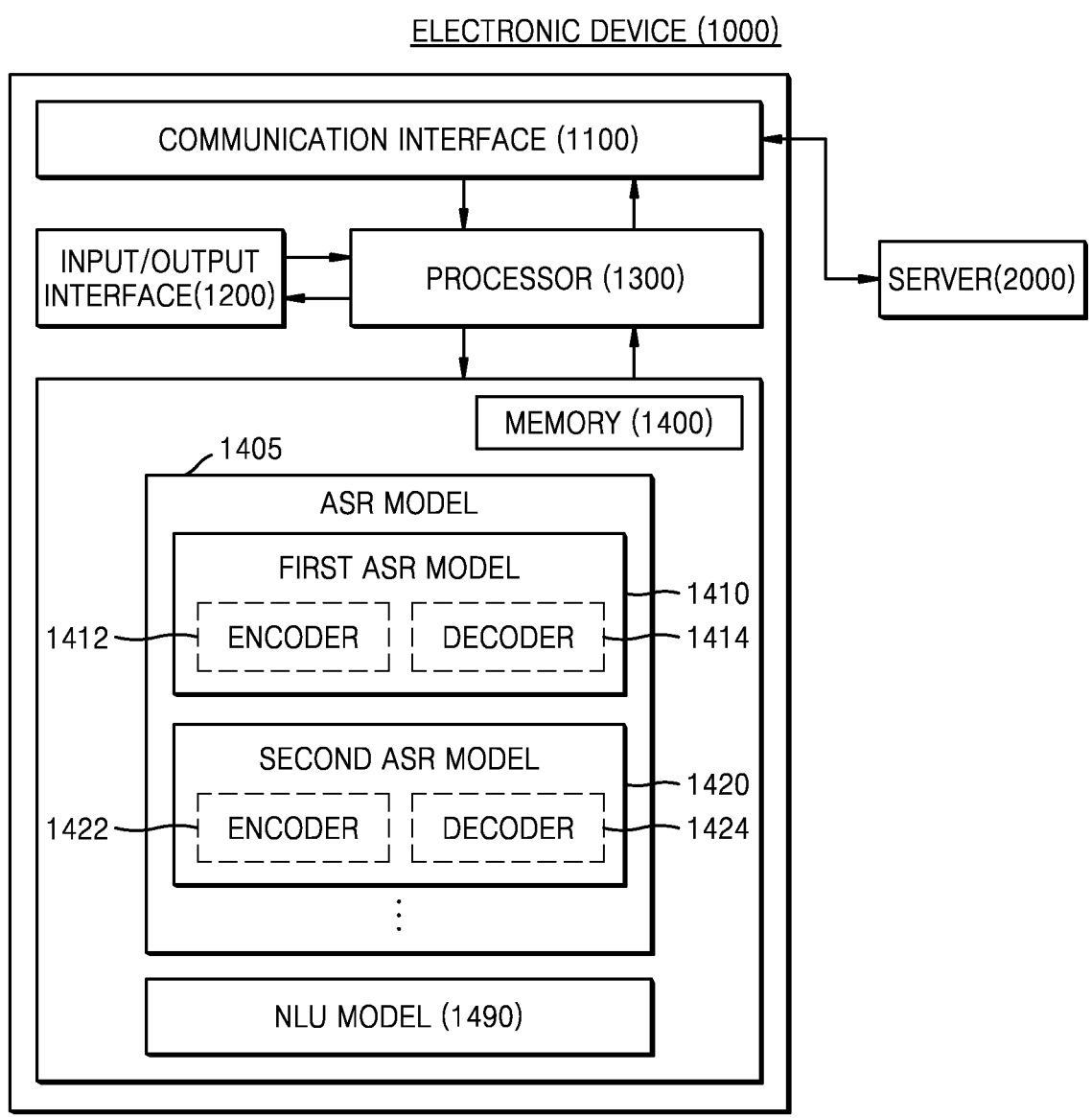
FIG. 15 is a block diagram illustrating an example electronic device according to another embodiment of the disclosure.

FIG. 14 is a block diagram illustrating an example electronic device 1000 according to an embodiment of the disclosure. FIG. 15 is a block diagram illustrating an example electronic device 1000 according to another embodiment of the disclosure.

Referring to FIG. 14, the electronic device 1000 according to an embodiment of the disclosure may include a processor (e.g., including processing circuitry) 1300 and a memory 1400. However, all of the illustrated components are not essential. The electronic device 1000 may be implemented by more or less components than those illustrated in FIG. 14. For example, referring to FIG. 15, the electronic device 1000 may further include a communication interface (e.g., including communication circuitry) 1100 and an input/output interface (e.g., including input/output circuitry) 1200, and the memory 1400 may include a plurality of ASR models (e.g., including processing circuitry and/or executable program elements) 1405 and a natural language understanding (NLU) model (e.g., including processing circuitry and/or executable program elements) 1490.

The communication interface 1100 may include various communication circuitry included in at least one component for communication with a server 2000 and an external device (not shown). The communication interface 1100 may transmit or receive information for ASR and a voice assistant service to or from the server 2000 and the external device. The communication interface 1100 may perform communication via, for example, a LAN, a WAN, a VAN, a mobile radio communication network, a satellite communication network, and a combination thereof, but embodiments of the disclosure are not limited thereto.

The input/output interface 1200 may include various input/output circuitry and receive data input to the electronic device 1000 and output data from the electronic device 1000. The input/output interface 1200 may include a user input interface, a camera, a microphone, a display, and an audio output interface. The user input interface may include, but not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The display (not shown) may display information that is processed by the electronic device 1000. For example, the display may display a graphical user interface (GUI) for a voice assistant service. When the display forms a layer structure together with a touch pad to construct a touch screen, the display may be used as an input device as well as an output device. The display may include at least one selected from a liquid crystal display (LCD), a thin film transistor-liquid crystal display (TFT-LCD), an organic light-emitting diode (OLED), a flexible display, a 3D display, and an electrophoretic display.

The audio output interface (not shown) may output audio data and may include, for example, a speaker and a buzzer.

The camera may (not shown) obtain an image frame, such as a still image or a moving picture, via an image sensor in a video call mode or a photography mode. An image captured via the image sensor may be processed by the processor 1300 or a separate image processor (not shown).

The microphone (not shown) may receive an utterance of a user and may process the utterance of the user into electrical audio data.

The processor 1300 may include various processing circuitry and controls overall operations of the electronic device 1000. The processor 1300 may control the overall operations of the electronic device 1000 described herein, by executing the programs stored in the memory 1400.

For example, the processor 1300 may obtain an audio signal, based on a speech input of a user, and, in response to the audio signal, may obtain an output value of a first ASR model that outputs a character string at a first level. The processor 1300 may recognize speech of the user by obtaining an output value of a second ASR model that outputs a character string at a second level corresponding to the audio signal, based on the output value of the first ASR model.

The processor 1300 may split the audio signal into frames, may obtain a feature value of each of the frames of the audio signal, and input the feature value of each of the frames of the audio signal to an ASR model.

The processor 1300 may obtain an output value of a first encoder that is included in the first ASR model and encodes an audio signal input to the electronic device 1000 such that the character string at the first level is output, and determine the obtained output value of the first encoder to be the output value of the first ASR model.

According to an embodiment of the disclosure, the processor 1300 may obtain an output value of a first decoder that is included in the first ASR model and determines the character string at the first level corresponding to the audio signal from the output value of the first encoder, and determine the output value of the first encoder and the output value of the first decoder to be the output value of the first ASR model.

The processor 1300 may obtain an output value of a second encoder that is included in the second ASR model and encodes an audio signal, based on the output value of the first ASR model, such that the character string at the second level is output, and may determine the obtained output value of the second encoder to be the output value of the second ASR model. The processor 1300 may more improve ASR accuracy of the second ASR model, by encoding the audio signal, based on the output value of the first ASR model.

The processor 1300 may apply an attention to each of the output value of the second encoder and the output value of the first decoder, and may determine the output value of the second ASR model from the attention-applied output value of the second encoder and the attention-applied output value of the first decoder.

The memory 1400 may include one or more instructions for controlling an operation of the electronic device 1000. The memory 1400 may also include an NLU mode in addition to one or more ASR models for recognizing speech of a user within an audio signal. The programs stored in the memory 1400 may be classified into the ASR models 1405, the NLU model 1490, a user interface (UI) module (not shown), a touch screen module (not shown), and a notification module (not shown), and the like according to their functions.

According to an embodiment of the disclosure, the memory 1400 may include, but is not limited to, at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The ASR models 1405 may include various processing circuitry and/or executable program elements and encode the audio signal input to the electronic device 1000. The ASR models 1405 may be end-to-end ASR models, and the ASR models 1405 may include a plurality of ASR models such as a first ASR model 1410 and a second ASR model 1420.

The plurality of ASR models 1410 and 1420 may include encoders 1412 and 1422 and decoders 1414 and 1424, respectively. The audio signal input to the electronic device 1000 may be encoded by an encoder included in each of the plurality of ASR models. Each of the encoders 1412 and 1422 included in the plurality of ASR models, respectively, may include a plurality of layers, for example, a plurality of stacked LSTM layers. An output value of each encoder may be one of the output values output by the plurality of layers in the encoder. The output value of the encoder may be a hidden layer vector output by a layer included in the encoder. The plurality of ASR models 1410 and 1420 may determine character strings at different levels from the audio signal via the encoders and decoders respectively included within the plurality of ASR models 1410 and 1420.

The NLU model 1490 may include various processing circuitry and/or executable program elements and interpret the character strings output by the ASR models 1405. Alternatively, the NLU model 1490 may interpret a character string provided by an ASR model of the server 2000. When the server 2000 provides the electronic device 1000 with an output value of the ASR model included in the server 2000, the NLU model 1490 may interpret the output value of the ASR model provided from the server 2000.

Figure 16:
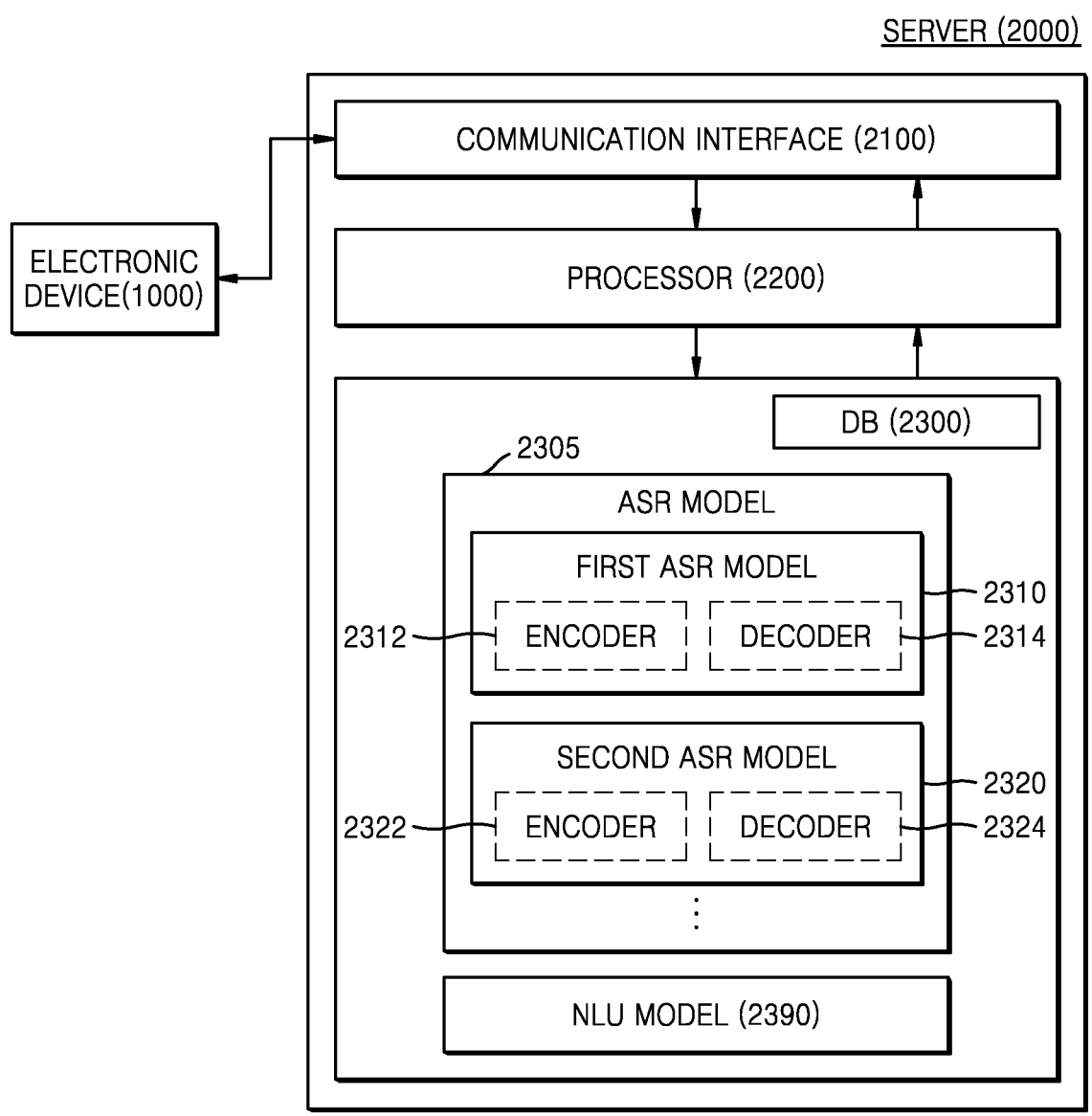
FIG. 16 is a block diagram illustrating an example server according to an embodiment of the disclosure.

FIG. 16 is a block diagram illustrating an example server 2000 according to an embodiment of the disclosure.

According to an embodiment of the disclosure, the server 2000 may include a communication interface (e.g., including communication circuitry) 2100, a processor (e.g., including processing circuitry) 2200, and a database (DB) 2300, and the DB 2300 may include a plurality of ASR models (e.g., including processing circuitry and/or executable program elements) 2305 and an NLU model (e.g., including processing circuitry and/or executable program elements) 2390.

The communication interface 2100 may include various communication circuitry included in at least one component for communication with the electronic device 1000 and another server (not shown). The communication interface 2100 may transmit or receive information for ASR and a voice assistant service to or from the electronic device 1000 and the other server. The communication interface 2100 may perform communication via, for example, a LAN, a WAN, a VAN, a mobile radio communication network, a satellite communication network, and a combination thereof, but embodiments of the disclosure are not limited thereto.

The processor 2200 may include various processing circuitry and controls an overall operation of the server 2000. The processor 2200 may control the overall operations of the server 2000 described herein, by executing the programs stored in the DB 2300.

The DB 2300 may store a program used by the processor 2200 to perform processing and control, and may also store data that is input to or output from the server 2000. The DB 2300 may include, but is not limited to, at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the DB 2300 may be classified into a plurality of modules according to their functions, for example, the plurality of ASR models 2305 and the NLU model 2390.

The ASR models 2305 may include various processing circuitry and/or executable program elements and may include a plurality of ASR models, and may include a first ASR model 2310 and a second ASR model 2320. The first ASR model 2310 may include at least one of an encoder 2312 and a decoder 2314, and the second ASR model 2320 may include at least one of an encoder 2322 and a decoder 2324. The ASR models 2305 in the server 2000 may correspond to the ASR models 1405 of the electronic device 1000, and thus a detailed description thereof may not be repeated here.

The NLU model 2390 may include various processing circuitry and/or executable program elements and interpret the character strings output by the ASR models 2305. Alternatively, the NLU model 2390 may interpret a character string provided by an ASR model of the electronic device 1000. The NLU model 2390 stored in the server 2000 may correspond to the NLU model 1490 stored in the memory 1400 of the electronic device 1000, and thus a detailed description thereof may not be repeated here.

Figure 17:
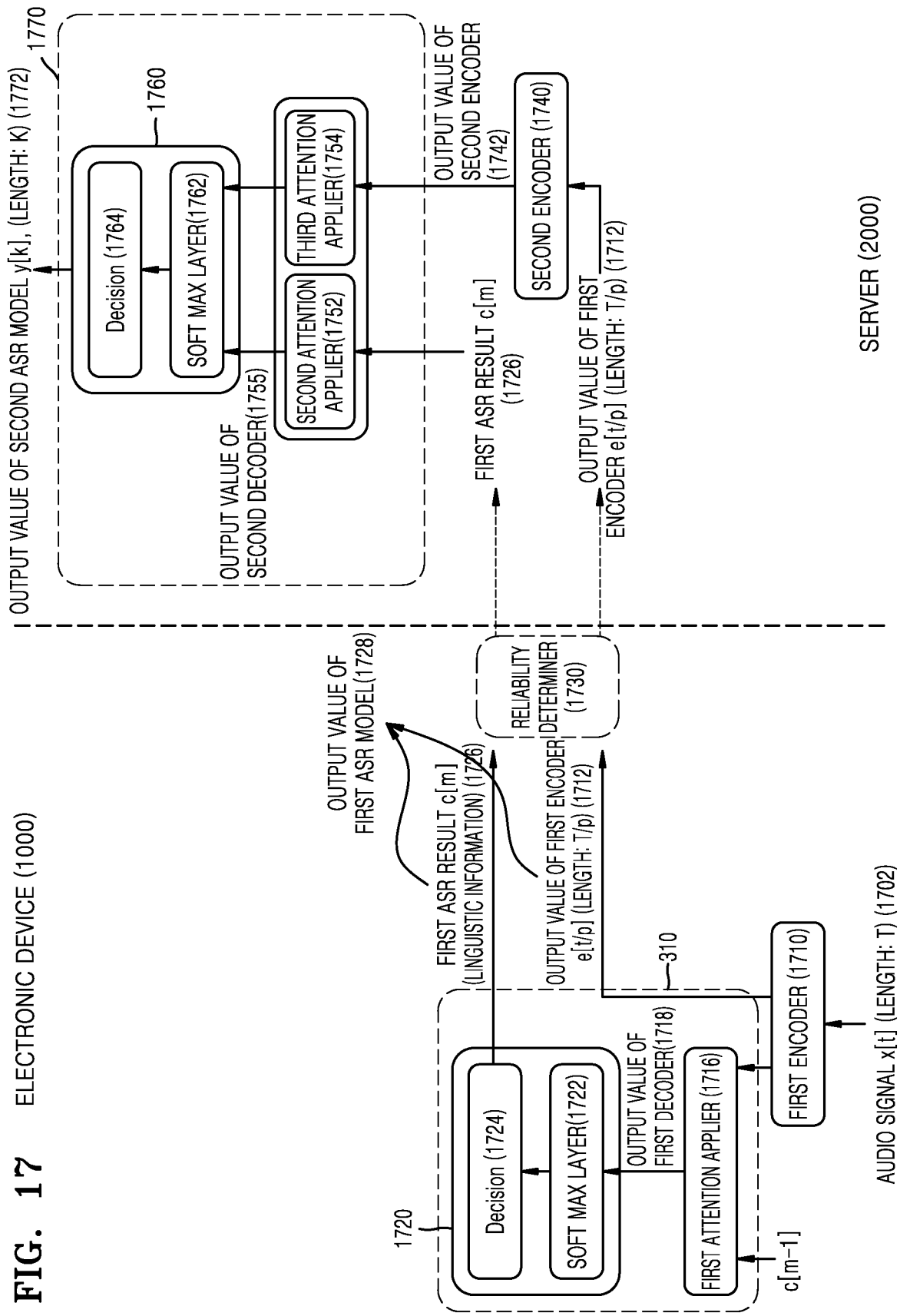
FIG. 17 is a block diagram illustrating an example method of recognizing speech of a user via inter-operation between an electronic device and a server, according to an embodiment of the disclosure.

FIG. 17 is a block diagram illustrating an example method of recognizing speech of a user via inter-operation between an electronic device 1000 and a server 2000, according to an embodiment of the disclosure.

According to an embodiment of the disclosure, the electronic device 1000 may recognize speech of a user within an audio signal by interoperating with the server 2000. According to an embodiment of the disclosure, the electronic device 1000 stores in a memory a first ASR model that outputs a character string at a first level, and the server 2000 stores in a DB a second ASR model that outputs a character string at a second level, and, in this state, the electronic device 1000 and the server 2000 may interoperate with each other to thereby provide an ASR service.

According to another embodiment of the disclosure, the first ASR model 310 and the second encoder 1040 included in the second ASR model 320 from among the components of an ASR model 1080 shown in FIG. 10 are mounted in the electronic device 1000, and only the second decoder 1070 included in the second ASR model 320 is mounted in the server 2000, and, in this state, the electronic device 1000 and the server 2000 may interoperate with each other to thereby provide an ASR service.

A method of providing an ASR service via inter-operation between the electronic device 1000 and the server 2000 when the first ASR model 310 is mounted in the electronic device 1000 and the second ASR model 320 is mounted in the server 2000 will now be described in detail with reference to FIG. 17.

The first ASR model 310 may include a first encoder 1710, a first attention applier 1716, and a first output layer 1720. The first ASR model 310 may output a character string at a first level as a first ASR result 1726 from an audio signal 1702. The first ASR model 310 may determine the first ASR result 1726 and an output value 1712 of the first encoder 1710 to be an output value 1728 of the first ASR model 310. In other words, the output value 1728 of the first ASR model 310 may include the first ASR result 1726 and the output value 1712 of the first encoder 1710.

The first encoder 1710 may encode feature values of a plurality of frames included in the audio signal 1702 such that the first ASR model 310 outputs the character string at the first level. The first encoder 1710 may correspond to the first encoder 1010 of FIG. 10, and thus a detailed description thereof will be omitted. The first attention applier 1716 may determine attentions to be applied to the output values of the first encoder 1710, based on an output value of the first ASR model 310 at a previous time, and may apply the determined attentions to the output values of the first encoder 1010 to thereby output a first context vector. The first attention applier 1716 may correspond to the first attention applier 1016 of FIG. 10, and thus a detailed description thereof will be omitted.

A soft max layer 1722 may determine a probability value that the first context vector output by the first attention applier 1716 corresponds to a certain label within the soft max layer 1722. The soft max layer 1722 may correspond to the soft max layer 1022 of FIG. 10, and thus a detailed description thereof will be omitted. Based on the probability value determined by the soft max layer 1722, at which the first context vector is to correspond to the certain label, the decision layer 1724 may output a character string at a first level corresponding to a label representing a highest probability.

The electronic device 1000 may transmit, to a reliability determiner 1730, an output value of the first ASR model 310 including the first encoder 1710, the first attention applier 1716, and the first output layer 1720. For example, the electronic device 1000 may transmit the first ASR result 1726 and the output value 1712 of the first encoder 1710 to the reliability determiner 1730.

The reliability determiner 1730 may determine a reliability of the output value of the first ASR model 310, and may determine, based on the determined reliability, whether to transmit the output value of the first ASR model 310 to the server 2000. According to an embodiment of the disclosure, a function of the reliability determiner 1730 may be stored in the form of a computer executable instruction in the memory, and may be executed by a processor of the electronic device 1000.

According to an embodiment of the disclosure, the reliability of the output value of the first ASR model 310 may be a figure representing a degree to which the output value of the first ASR model 310 matches with an input speech for example, a confidence score, but embodiments of the disclosure are not limited thereto. The reliability of the output value of the first ASR model 310 may represent a degree to which a text represented by the output value of the first ASR model 310 is consistent with an input speech.

According to an embodiment of the disclosure, the electronic device 1000 may determine the reliability of the output value of the first ASR model 310, based on a reliability of the first ASR result 1726 and the output value 1712 of the first encoder 1710. According to an embodiment of the disclosure, when the reliability of the first ASR result 1726 is equal to or greater than a first threshold reliability and the reliability of the output value 1712 of the first encoder 1710 is equal to or greater than a second threshold reliability, the electronic device 1000 may determine that the reliability of the output value of the first ASR model 310 is equal to or greater than a preset threshold value. According to another embodiment of the disclosure, when the reliability of the first ASR result 1726 is equal to or greater than the first threshold reliability or the reliability of the output value 1712 of the first encoder 1710 is equal to or greater than the second threshold reliability, the electronic device 1000 may determine that the reliability of the output value of the first ASR model 310 is equal to or greater than the preset threshold value.

The electronic device 1000 may determine whether to transmit the output value of the first ASR model 310 to the server 2000, based on the reliability of the output value of the first ASR model 310. When it is determined that the reliability of the output value of the first ASR model 310 is equal to or greater than the preset threshold value, the electronic device 1000 may transmit the output value of the first ASR model 310 to the server 2000. When it is determined that the reliability of the output value of the first ASR model 310 is less than the preset threshold value, the electronic device 1000 may transmit the output value of the first ASR model 310 to the server 2000.

According to an embodiment of the disclosure, the server 2000 may receive the output value of the first ASR model 310 including the first ASR result 1726 and the output value 1712 of the first encoder 1710 from the electronic device 1000, and may input the received output value of the first ASR model 310 to the second ASR model 320, such that the character string at the second level may be output.

For example, the second ASR model 320 stored in the server 2000 may include a second encoder 1740 and a second decoder 1770, and the second decoder 1770 may include a second attention applier 1752, a third attention applier 1754, and a second output layer 1760. The second output layer 1760 may include a soft max layer 1762 and a decision layer 1764.

An output value 1742 of the second encoder 1740 of the server 2000 may be input to the third attention applier 1754, and the first ASR result 1726 received from the electronic device 1000 may be input to the second attention applier 1752 of the server 2000. The second attention applier 1752 may apply an attention to the first ASR result 1726 and weighted-sum an attention-applied first ASR result to thereby generate a second context vector. The third attention applier 1754 may apply an attention to the output value 1742 of the second encoder 1740 and weighted-sum an attention-applied output value of the second encoder 1740 to thereby generate a third context vector.

The second output layer 1760 may receive the second context vector and the third context vector respectively output by the second attention applier 1752 and the third attention applier 1754, and may output a label that corresponds to the second context vector and the third context vector at a highest probability.

A soft max layer 1762 within the server 2000 may determine probability values that the second context vector output by the second attention applier 1752 and the third context vector output by the third attention applier 1754 correspond to certain labels. According to an embodiment of the disclosure, the soft max layer 1762 may determine a probability value that a concatenated vector obtained by concatenating the second and third context vectors corresponds to a certain label. In other words, an output value 1755 of the second decoder 1770 may include the concatenated vector obtained by concatenating the second and third context vectors.

The decision layer 1764 may determine a character string at a second level corresponding to a particular label, based on a probability value that the output value 1755 of the second decoder 1770 output by the soft max layer 1762 corresponds to the certain label. The server 2000 may transmit information about the output character string at the second level to the electronic device 1000, and the electronic device 1000 may provide the information about the output character string at the second level received from the server 2000 to the user.

The second ASR model 320 within the server 2000 may determine the output value 1742 of the second encoder 1740 to be an output value 1772 of the second ASR model 320, or may determine the output value 1042 of the second encoder 1040 and a second ASR result determined from the output value of the second decoder 1040 to be the output value 1772 of the second ASR model 320. In other words, the output value 1772 of the second ASR model 320 may include the output value 1755 of the second encoder 1740, or may include both the output value 1755 of the second encoder 1740 and the second ASR result. The server 2000 may transmit the output value 1772 of the second ASR model 320 back to the electronic device 1000 such that the electronic device 1000 may provide the user with an ASR result of a second level.

According to another embodiment of the disclosure, when the first ASR model 310 and the second encoder 1740 within the second ASR model 320 are mounted in the electronic device 1000 and only the second decoder 1770 in the second ASR model 320 is mounted in the server 2000, the server 2000 may receive the output value 1742 of the second encoder 1740 and the first ASR result 1726 from the electronic device 1000, and may output the character string at the second level from the audio signal 1702, based on the received output value 1742 of the second encoder 1740 and the first ASR result 1726.

Figure 18:
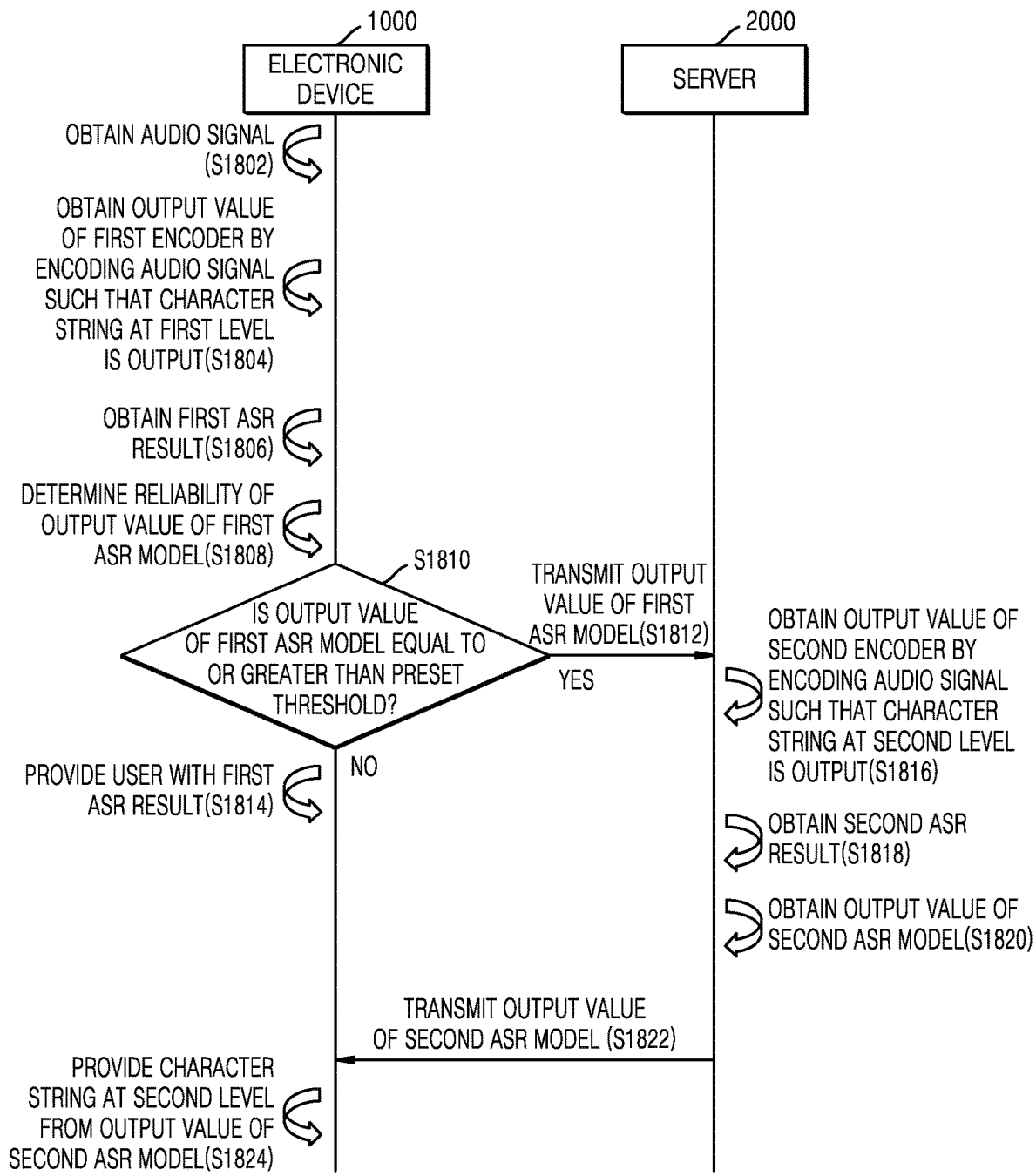
FIG. 18 is a flowchart illustrating an example method of recognizing speech of a user via inter-operation between an electronic device and a server, according to another embodiment of the disclosure.

FIG. 18 is a flowchart illustrating an example method of recognizing speech of a user via inter-operation between an electronic device 1000 and a server 2000, according to another embodiment of the disclosure.

In operation S1802, the electronic device 1000 obtains an audio signal. According to an embodiment of the disclosure, the electronic device 1000 may obtain an audio signal divided into a plurality of frames, and may input the obtained audio signal to a first ASR model.

In operation S1804, the electronic device 1000 may obtain an output value of a first encoder included in the first ASR model by encoding the audio signal such that a character string at a first level is output, using the first ASR model including the first encoder. According to an embodiment of the disclosure, the output value of the first encoder may be a hidden layer vector output by an LSTM layer included in the first encoder.

In operation S1806, the electronic device 1000 may obtain a first ASR result from the output value of the first encoder. According to an embodiment of the disclosure, the electronic device 1000 may obtain the character string at the first level as the first ASR result from the output value of the first encoder. The electronic device 1000 may determine information about the obtained character string at the first level and the output value of the first encoder to be an output value of the first ASR model.

In operation S1808, the electronic device 1000 may determine a reliability of the output value of the first ASR model. According to an embodiment of the disclosure, when a reliability of the first ASR result within the output value of the first ASR model is equal to or greater than a first threshold reliability and a reliability of the output value of the first encoder within the output value of the first ASR model is equal to or greater than a second threshold reliability, the electronic device 1000 may determine that the output value of the first ASR model is equal to or greater than a preset threshold value.

In operation S1810, the electronic device 1000 may determine whether to transmit the output value of the first ASR model to the server 2000, based on whether the output value of the first ASR model is equal to or greater than the preset threshold value. In operation S1812, when the reliability of the output value of the first ASR model is equal to or greater than the preset threshold value, the electronic device 1000 may transmit the output value of the first ASR model to the server 2000.

In operation S1814, when the reliability of the output value of the first ASR model is less than the preset threshold value, the electronic device 1000 may not transmit the output value of the first ASR model to the server 2000 and may provide a user with the first ASR result via an output interface of the electronic device 1000.

In operation S1816, the server 2000 may obtain an output value of a second encoder included in a second ASR model trained to output a character string at a second level. According to an embodiment of the disclosure, the second encoder in the server 2000 may be trained such that the second ASR model outputs the character string at the second level, based on the output value of the first ASR model received from the electronic device 1000.

In operation S1818, the server 2000 may obtain a second ASR result from the output value of the second encoder. According to an embodiment of the disclosure, the server 2000 may obtain the character string at the second level as the second ASR result from the output value of the second encoder. In operation S1820, the server 2000 may determine information about the obtained character string at the second level and the output value of the second encoder to be an output value of the second ASR model. According to another embodiment of the disclosure, the server 2000 may determine only information about the second ASR result, as the output value of the second ASR model.

In operation S1822, the server 2000 may transmit the output value of the second ASR model to the electronic device 1000. In operation S1824, the electronic device 1000 may determine the character string at the second level from the output value of the second ASR model received from the server 2000, and may provide the determined character string at the second level with a user.

Figure 19:
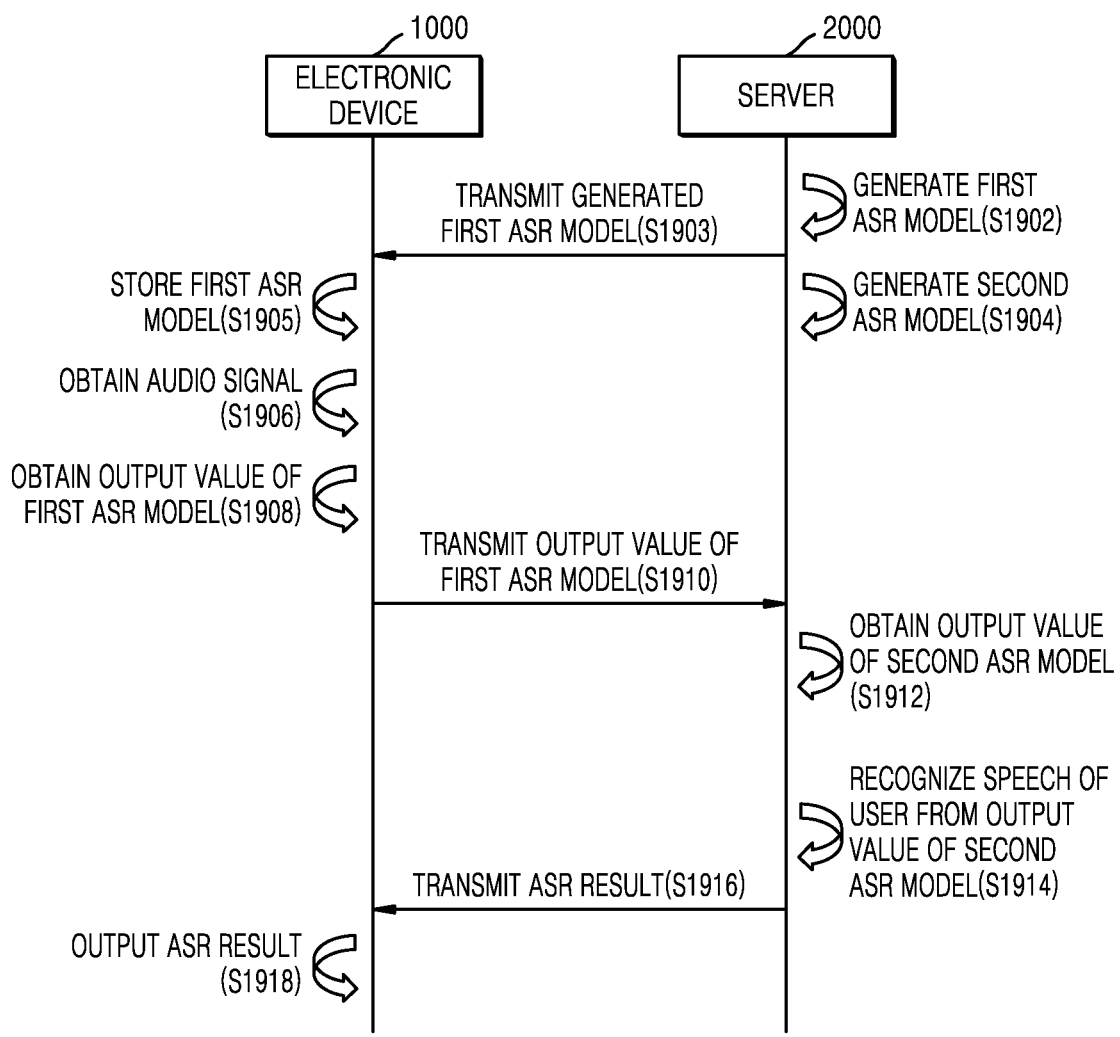
FIG. 19 is a flowchart illustrating an example method of recognizing speech of a user via inter-operation between an electronic device and a server, according to another embodiment of the disclosure.

FIG. 19 is a flowchart illustrating an example method of recognizing speech of a user via inter-operation between an electronic device 1000 and a server 2000, according to another embodiment of the disclosure.

In operation S1902, the server 2000 may generate a first ASR model. In operation S1903, the server 2000 may transmit the generated first ASR model to the electronic device 1000. In operation S1904, the server 2000 may generate a second ASR model. In operation S1905, the electronic device 1000 may store the first ASR model in a memory. However, according to another embodiment of the disclosure, the electronic device 1000 may generate the first ASR model.

According to an embodiment of the disclosure, the first ASR model may be trained by the server 2000 such that the character string at the first level is output. A second ASR model may be trained by the server 2000 such that a character string at a second level different from the first level is output.

In operation S1906, the electronic device 1000 may obtain an audio signal, based on a speech input of a user. Because operation S1906 may correspond to operation S1802 of FIG. 18, a repeated description thereof may not be repeated here. In operation S1908, the electronic device 1000 may obtain an output value of the first ASR model by inputting a feature value of each of a plurality of frames included in the audio signal to the first ASR model.

In operation S1910, the electronic device 1000 may transmit the output value of the first ASR model to the server 2000. According to an embodiment of the disclosure, the output value of the first ASR model may include the output value of a first encoder within the first ASR model. According to another embodiment of the disclosure, the output value of the first ASR model may further include a first ASR result output by the first ASR model.

In operation S1912, the server 2000 may obtain an output value of the second ASR model, based on the output value of the first ASR model. A process, performed by the server 2000, of obtaining the output value of the second ASR model based on the output value of the first ASR model corresponds to the operation of the second ASR model 320 of FIG. 10, and thus a detailed description thereof may not be repeated here.

In operation S1914, the server 2000 may recognize the speech of the user from the output value of the second ASR model. According to an embodiment of the disclosure, the server 2000 may output the character string at the second level as an ASR result from the output value of the second ASR model.

In operation S1916, the server 2000 may transmit the ASR result to the electronic device 1000, based on the output value of the second ASR model. In operation S1918, the electronic device 1000 may output the ASR result received from the server 2000.

A method, performed by an electronic device, of recognizing speech of a user, according to an embodiment of the disclosure, may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. In addition, a computer program product including a recording medium storing a program for causing the electronic device to perform a method of providing a virtual device related to the electronic device through at least a portion of the content displayed on the electronic device may be provided.

Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory.

Examples of the program commands are advanced language codes made by a compiler or codes executable by an interpreter or the like.

Some embodiments of the disclosure may also be embodied as a storage medium including instructions executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instructions, a data structure, a program module or other data. The communication medium typically includes the computer readable instructions, the data structure, the program module, or other data of a modulated data signal, or other transmission mechanism, and includes any information transmission medium. Some embodiments of the disclosure may be implemented as a computer program or a computer program product including computer-executable instructions such as computer programs executed by a computer.

While the disclosure have been described with reference to various example embodiments and the figures, it will be understood by those of ordinary skill in the art that various changes in form and details may be made therein without departing from the spirit and scope of the disclosure, including the following claims.

What is claimed is:

1. A method, performed by an electronic device, of recognizing speech of a user, the method comprising:
    obtaining an audio signal based on a speech input;
    based on the audio signal being input, obtaining an output value of a first speech recognition model that outputs a character string at a first level and a first encoded audio signal of the audio signal representing user acoustic information, wherein the first speech recognition model comprises a first encoder and a first decoder, wherein the character string at the first level is obtained by the first decoder based on the first encoded audio signal from the first encoder;
    obtaining an output value of a second speech recognition model that outputs a character string at a second level corresponding to the audio signal based on the output value of the first speech recognition model including the character string at the first level and the first encoded audio signal, wherein the second speech recognition model includes a second encoder and a second decoder, wherein the character string at the second level is obtained by the second decoder based on the character string at the first level and a second encoded audio signal, and wherein the second encoded audio signal is obtained by the second encoder based on the first encoded audio signal; and
    recognizing the speech from the output value of the second speech recognition model.

2. The method of claim 1, wherein the character string at the second level comprises sub-sets of a set including, at least one character within the character string at the first level.

3. The method of claim 1, wherein the character string at the second level comprises sub-strings that are more similar to a semantically-completed word than sub-strings within the character string at the first level.

4. The method of claim 1, wherein the obtaining of the audio signal comprises:
    splitting the audio signal into frames; and
    obtaining a feature value of each of the frames of the audio signal.

5. The method of claim 1, wherein the obtaining of the output value of the second speech recognition model comprises:
    applying an attention an output value of the second encoder and an output value of the first decoder; and
    obtaining the output value of the second speech recognition model from an output value of the second encoder to which the attention has been applied and an output value of the first decoder to which the attention has been applied.

6. The method of claim 5, wherein the first decoder comprises a plurality of stacked LSTM layers and an attention layer, wherein the attention layer is configured to apply an attention to an output value of the first encoder based on an output value of the first decoder at a previous time, and
    an output value of the first decoder comprises a sequence of context vectors generated by weighted summing the output value of the first encoder based on the attention.

7. The method of claim 5, wherein based on training of the first speech recognition model for outputting the character string at the first level being completed, the second speech recognition model is trained to output the character string at the second level, based on the output value of the first speech recognition model.

8. The method of claim 1, wherein each of the first encoder and the second encoder comprises a plurality of stacked long short-term memory (LSTM) layers, and
    an output value of the first encoder comprises a sequence of hidden layer vectors respectively output by LSTM layers selected from the plurality of stacked LSTM layers included in the first encoder, and
    an output value of the second encoder comprises a sequence of hidden layer vectors output by LSTM layers selected from the plurality of stacked LSTM layers included in the second encoder.

9. An electronic device configured to recognize speech, the electronic device comprising:
    a memory storing a program comprising one or more instructions; and
    a processor configured to execute the one or more instructions to control the electronic device to:
    obtain an audio signal based on a speech input;
    based on the audio signal being input, obtain an output value of a first speech recognition model configured to output a character string at a first level and first encoded audio signal of the audio signal representing user acoustic information, wherein the first speech recognition model comprises a first encoder and a first decoder, wherein the character string at the first level is obtained by the first decoder based on the first encoded audio signal from the first encoder;
    obtain an output value of a second speech recognition model configured to output a character string at a second level corresponding to the audio signal based on the output value of the first speech recognition model including the character string at the first level and the first encoded audio signal, wherein the second speech recognition model includes a second encoder and a second decoder, wherein the character string at the second level is obtained by the second decoder based on the character string at the first level and a second encoded audio signal, wherein the second encoded audio signal is obtained by the second encoder based on the first encoded audio signal; and recognize the speech from the output value of the second speech recognition model.

10. The electronic device of claim 9, wherein the character string at the second level comprises sub-sets of a set including, as an element, at least one character within the character string at the first level.

11. The electronic device of claim 9, wherein the processor is further configured to execute the one or more instructions to control the electronic device to: split the audio signal into frames and obtain a feature value of each of the frames of the audio signal.

12. The electronic device of claim 9, wherein the processor is further configured to execute the one or more instructions to control the electronic device to: apply an attention to an output value of the second encoder and an output value of the first decoder, and obtain the output value of the second speech recognition model from an output value of the second encoder to which the attention has been applied and an output value of the first decoder to which the attention has been applied.

13. The electronic device of claim 9, wherein each of the first encoder and the second encoder comprises a plurality of stacked long short-term memory (LSTM) layers, an output value of the first encoder comprises a sequence of hidden layer vectors respectively output by LSTM layers selected from the plurality of stacked LSTM layers included in the first encoder, and an output value of the second encoder comprises a sequence of hidden layer vectors output by LSTM layers selected from the plurality of stacked LSTM layers included in the second encoder.

14. A non-transitory computer-readable recording medium having recorded thereon a computer program, which, when executed by a computer, performs a method comprising:

obtaining an audio signal based on a speech input;

based on the audio signal being input to an electronic device, obtaining an output value of a first speech recognition model that outputs a character string at a first level and first encoded audio signal of the audio signal representing user acoustic information, wherein the first speech recognition model comprises a first encoder and a first decoder, wherein the character string at the first level is obtained by the first decoder based on the first encoded audio signal from the first encoder;

obtaining an output value of a second speech recognition model that outputs a character string at a second level corresponding to the audio signal based on the output value of the first speech recognition model including the character string at the first level and the first encoded audio signal, wherein the second speech recognition model includes a second encoder and a second decoder, wherein the character string at the second level is obtained by the second decoder based on the character string at the first level and a second encoded audio signal, wherein the second encoded audio signal is obtained by the second encoder based on the first encoded audio signal; and recognizing the speech from the output value of the second speech recognition model.

* * * * *